United States Patent [19]
Kozaki et al.

[11] Patent Number: 5,911,647
[45] Date of Patent: Jun. 15, 1999

[54] CONTROL APPARATUS FOR AUTOMATIC TRANSMISSION

[75] Inventors: Tetsuji Kozaki, Aichi-ken; Tsutomu Tashiro, Nagoya; Kouichi Aoyama; Masami Fujitsuna, both of Kariya, all of Japan

[73] Assignee: Denso Corporation, Kariya, Japan

[21] Appl. No.: 08/764,604

[22] Filed: Dec. 11, 1996

[30] Foreign Application Priority Data

Dec. 11, 1995 [JP] Japan .................................. 7-321676
Sep. 19, 1996 [JP] Japan .................................. 8-247911

[51] Int. Cl.$^6$ .................................................. F16H 61/04
[52] U.S. Cl. ........................... 477/143; 477/152; 477/155
[58] Field of Search .................................. 477/110, 143, 477/145, 148, 155, 149, 156, 158, 159, 152; 475/116, 117, 120, 128, 129

[56] References Cited

U.S. PATENT DOCUMENTS

| | | |
|---|---|---|
| 4,813,307 | 3/1989 | Hirmatsu et al. . |
| 4,930,375 | 6/1990 | Yamamoto et al. ...................... 477/152 |
| 4,955,256 | 9/1990 | Kashihara et al. ...................... 477/152 |
| 5,005,441 | 4/1991 | Narita . |
| 5,027,676 | 7/1991 | Fujiwara et al. ........................ 477/158 |
| 5,125,295 | 6/1992 | Iwatsuki et al. . |
| 5,443,432 | 8/1995 | Fujita et al. ............................. 477/155 |
| 5,527,236 | 6/1996 | Kimura et al. . |
| 5,643,135 | 7/1997 | Tabata et al. ............................ 477/154 |
| 5,667,457 | 9/1997 | Kuriyama et al. .................. 477/158 X |

FOREIGN PATENT DOCUMENTS

| | | |
|---|---|---|
| 0327004 | 8/1989 | European Pat. Off. . |
| 0372073 | 6/1990 | European Pat. Off. . |
| 0435378 | 7/1991 | European Pat. Off. . |
| 0611479 | 7/1995 | European Pat. Off. . |
| 0730112 | 9/1996 | European Pat. Off. . |
| 60-227048 | 11/1985 | Japan . |
| 62-147153 | 7/1987 | Japan . |
| 63-289359 | 11/1988 | Japan . |
| 1-266353 | 10/1989 | Japan . |
| 2-209664 | 8/1990 | Japan . |
| 3-144159 | 6/1991 | Japan . |
| 4-157258 | 5/1992 | Japan . |
| 5-035294 | 5/1993 | Japan . |
| 6-235451 | 8/1994 | Japan . |
| 6-341524 | 12/1994 | Japan . |
| 7-027219 | 1/1995 | Japan . |

*Primary Examiner*—Charles A Marmor
*Assistant Examiner*—Marcus Charles
*Attorney, Agent, or Firm*—Pillsbury Madison & Sutro LLP

[57] ABSTRACT

An automotive automatic transmission has an input shaft receiving a rotational force from an engine, an output shaft for outputting a rotational force to a vehicle driving wheel, a frictional engagement device having an adjustable engagement condition, and a transmission device for transmitting a rotational force from the input shaft to the output shaft at a gear speed ratio depending on the engagement condition of the frictional engagement device. A control apparatus for the automotive automatic transmission includes an engagement condition adjusting device for adjusting the engagement condition of the frictional engagement device by feeding a hydraulic pressure thereto in response to an instructed control amount. The control apparatus also includes a control amount calculating device for calculating the control amount such that a time-domain variation in the control amount is along a curve which corresponds to a monotonic increase and whose variation rate gradually increases, or such that a time-domain variation in the control amount is along a curve which corresponds to a monotonic decrease and whose variation rate gradually decreases.

30 Claims, 22 Drawing Sheets

(PRIOR ART)

CONTROL APPARATUS FOR AUTOMATIC TRANSMISSION

BACKGROUND OF THE INVENTION

1. Field of the Invention

This invention generally relates to a control apparatus for an automatic transmission in a vehicle such as an automotive vehicle.

2. Description of the Prior Art

In automatic transmissions of automotive vehicles, a quicker gear shift causes a greater shock. On the other hand, an excessively-slow gear shift tends to damage frictional engagement parts of the automatic transmission. It is desirable to suppress a shock upon a gear shift. Also, it is desirable to prevent damage to the frictional engagement parts of the automatic transmission.

Japanese published unexamined patent application 63-1289359 discloses an apparatus for controlling a hydraulic working pressure in a clutch of an automatic transmission to suppress a shock upon a gear shift. In the apparatus of Japanese application 63-289359, the hydraulic working pressure in the clutch is gradually increased during the former half of the time interval of a gear shift. Then, the hydraulic working pressure is held at a constant level during the latter half of the time interval of the gear shift.

U.S. Pat. No. 5,527,236 corresponding to Japanese published unexamined patent application 6-341524 discloses a shift control system for an automatic transmission including frictional engagement elements which can be driven by movement of a piston in response to an oil pressure. The system of U.S. Pat. No. 5,527,236 includes a pressure regulating valve for regulating the oil pressure, a shift detector for detecting a shift, and a low-pressure standby unit for setting the regulated oil pressure level to a specified value during a predetermined time period after the shift has been detected. The specified value of the oil pressure is such as to move only the piston. The system of U.S. Pat. No. 5,527,236 further includes a booster for gradually increasing the oil pressure after the lapse of the predetermined time period.

U.S. Pat. No. 5,005,441 corresponding to Japanese published unexamined patent application 1-266353 discloses an automatic transmission designed to suppress a shock upon a gear shift. The automatic transmission of U.S. Pat. No. 5,005,441 includes an accumulator in a hydraulic circuit connected to a frictional device for implementing a change among different gear positions. In the automatic transmission of U.S. Pat. No. 5,005,441, an accumulator back-up pressure is variable in response to engine load and also to the progress of a shift taking place. Accordingly, a hydraulic working pressure in the frictional device is controlled in response to the engine load and also the progress of the shift.

U.S. Pat. No. 4,813,307 corresponding to Japanese published unexamined patent application 60-227048 discloses a method of controlling a hydraulic working pressure in a frictional engagement element of an automatic transmission gear system. Basically, the hydraulic working pressure in the frictional engagement element is subjected to feedback control during a gear shift. According to the method in U.S. Pat. No. 4,813,307, a desired hydraulic working pressure in an initial stage of a gear shift is determined by learning a hydraulic working pressure which have occurred in a later stage of a previous gear shift.

U.S. Pat. No. 5,125,295 corresponding to Japanese published unexamined patent application 4-157258 discloses a speed stage shifting of an automatic transmission in a vehicle by engagement of a hydraulically operated friction engaging means through supply of a hydraulic fluid to the friction engaging means via a passage means including an accumulator. The accumulator is operative with support by a back pressure. According to U.S. Pat. No. 5,125,295, the back pressure is first maintained at an incipient pressure level, and is increased from the incipient pressure level toward a regular pressure level upon the lapse of a delay time from the detection of a transition phase in the case where the transition phase starts before the lapse of a guard time. The back pressure is increased from the incipient pressure level toward the regular pressure level upon the lapse of the guard time in the case where the guard time lapses before the start of the transmission phase. According to U.S. Pat. No. 5,125,295, the regular level of the accumulator back pressure is modified for an increase based upon the level of the accumulator back pressure at a moment at which the transition phase starts in the process of increasing the accumulator back pressure as started after the lapse of the guard time.

SUMMARY OF THE INVENTION

It is an object of this invention to provide an improved control apparatus for an automatic transmission in a vehicle such as an automotive vehicle.

A first aspect of this invention provides a control apparatus for an automotive automatic transmission having an input shaft receiving a rotational force from an engine, an output shaft for outputting a rotational force to a vehicle driving wheel, a frictional engagement means having an adjustable engagement condition, and a transmission means for transmitting a rotational force from the input shaft to the output shaft at a gear speed ratio depending on the engagement condition of the frictional engagement means, the control apparatus comprising an engagement condition adjusting means for adjusting the engagement condition of the frictional engagement means by feeding a hydraulic pressure thereto in response to an instructed control amount; and a control amount calculating means for calculating the control amount such that a time-domain variation in the control amount is along a curve which corresponds to a monotonic increase and whose variation rate gradually increases, or such that a time-domain variation in the control amount is along a curve which corresponds to a monotonic decrease and whose variation rate gradually decreases.

A second aspect of this invention is based on the first aspect thereof, and provides a control apparatus further comprising a learn correction means for learn-correcting the curve in response to a previous shift condition.

A third aspect of this invention is based on the first aspect or the second aspect thereof, and provides a control apparatus further comprising a slope correcting means for correcting a slope of the curve in response to the hydraulic pressure fed to the engagement condition adjusting means and a torque applied to the input shaft.

A fourth aspect of this invention is based on one of the first aspect to the third aspect thereof, and provides a control apparatus wherein an initial value of the control amount is set in accordance with characteristics of the frictional engagement means and the engagement condition adjusting means.

A fifth aspect of this invention provides a control apparatus for an automotive automatic transmission which comprises an input shaft receiving a rotational force from an engine; an output shaft for outputting a rotational force to a vehicle driving wheel; a transmission gear mechanism disposed between the input shaft and the output shaft and having a plurality of frictional engagement elements moved into engagement by hydraulic pressures, and a planetary gear mechanism in which holding conditions of rotation elements are decided by engagement conditions of the frictional engagement elements; an engagement condition change means for selecting a frictional engagement element, which is changed from a non-engagement condition to an engagement condition in correspondence with a change of a transmission gear position, from among the frictional engagement elements; a hydraulic pressure control means for controlling a hydraulic pressure applied to the frictional engagement element selected by the engagement condition change means; and a control command output means for outputting a control command value for hydraulic pressure control with respect to the hydraulic pressure control means; wherein the control command output means comprises a transmission initial hydraulic pressure control means for, during a stage before a start of an inertia phase at a start of a transmission gear change action, outputting the control command value with respect to the hydraulic pressure control means while increasing the control command value such that the hydraulic pressure applied to the frictional engagement element is gradually increased, and a rate of an increase thereof increases in accordance with a lapse of time.

A sixth aspect of this invention is based on the fifth aspect thereof, and provides a control apparatus wherein the transmission initial hydraulic pressure control means outputs the control command value which is expressed by a function having a second or higher order with respect to time.

A seventh aspect of this invention is based on the fifth aspect or the sixth aspect thereof, and provides a control apparatus wherein the transmission initial hydraulic pressure control means outputs the control command value such that after an increase rate of the control command value reaches a given value, the increase rate of the control command value is fixed to the given value.

An eighth aspect of this invention provides a control apparatus for an automotive automatic transmission which comprises an input shaft receiving a rotational force from an engine; an output shaft for outputting a rotational force to a vehicle driving wheel; a transmission gear mechanism disposed between the input shaft and the output shaft and having a plurality of frictional engagement elements moved into engagement by hydraulic pressures, and a planetary gear mechanism in which holding conditions of rotation elements are decided by engagement conditions of the frictional engagement elements; an engagement condition change means for selecting a frictional engagement element, which is changed from a non-engagement condition to an engagement condition in correspondence with a change of a transmission gear position, from among the frictional engagement elements; a hydraulic pressure control means for controlling a hydraulic pressure applied to the frictional engagement element selected by the engagement condition change means; and a control command output means for outputting a control command value for hydraulic pressure control with respect to the hydraulic pressure control means; wherein the control command output means comprises a transmission initial hydraulic pressure control means for, during a stage before a start of an inertia phase at a start of a transmission gear change action, outputting the control command value with respect to the hydraulic pressure control means while increasing the control command value such that the hydraulic pressure applied to the frictional engagement element is gradually increased, and the control command value with respect to the hydraulic pressure control means is increased at a first slope for a given time interval and is then increased at a second slope greater than the first slope so as to provide a greater increase rate after a lapse of the given time interval.

A ninth aspect of this invention is based on one of the fifth aspect to the eighth aspect thereof, and provides a control apparatus wherein the transmission initial hydraulic pressure control means comprises a lower initial value setting means for setting a lower initial value so as to provide an engagement hydraulic pressure lower than a normal as an initial value of the control command value.

A tenth aspect of this invention is based on one of the fifth aspect to the ninth aspect thereof, and provides a control apparatus wherein the control command output means comprises a quick charge control means for, prior to operation of the transmission initial hydraulic pressure control means, quickly charging the frictional engagement element, which is changed from the non-engagement condition to the engagement condition, with hydraulic working fluid.

An eleventh aspect of this invention is based on one of the fifth aspect to the tenth aspect thereof, and provides a control apparatus wherein the hydraulic pressure control means comprises a direct control means for directly controlling the hydraulic pressure applied to the frictional engagement element.

A twelfth aspect of this invention is based on one of the fifth aspect to the tenth aspect thereof, and provides a control apparatus wherein the hydraulic pressure control means comprises a line pressure control means for adjusting a line pressure of a hydraulic passage for feeding pressurized hydraulic fluid to the frictional engagement element.

A thirteenth aspect of this invention is based on the twelfth aspect thereof, and provides a control apparatus wherein the line pressure is applied to the frictional engagement element via an accumulator.

A fourteenth aspect of this invention is based on one of the fifth aspect to the seventh aspect thereof, and provides a control apparatus wherein the transmission initial hydraulic pressure control command means comprises a learn correction means for learn-correcting a calculation condition of the control command value on the basis of an outcome of a transmission shift.

A fifteenth aspect of this invention is based on the fourteen aspect thereof, and provides a control apparatus wherein the learn correction means comprises a time measurement means for measuring a time interval from a start of an increase in an initial hydraulic pressure to a start of an inertia phase; a reference time setting means for setting a predetermined reference time interval; and an initial hydraulic pressure change means for changing an initial hydraulic pressure at a start of an increase in response to a difference between the time interval measured by the time measurement means and the reference time interval.

A sixteenth aspect of this invention is based on the fifteenth aspect thereof, and provides a control apparatus wherein the initial hydraulic pressure change means increases the initial hydraulic pressure as the time interval measured by the time measurement means is longer than the reference time interval.

A seventeenth aspect of this invention is based on the sixteenth aspect thereof, and provides a control apparatus wherein the initial hydraulic pressure change means increases the initial hydraulic pressure by an amount proportional to the difference between the time interval measured by the time measurement means and the reference time interval.

An eighteenth aspect of this invention is based on the fourteenth aspect thereof, and provides a control apparatus wherein the learn correction means comprises a time measurement means for measuring a time interval from a start of an increase in an initial hydraulic pressure to a start of an inertia phase; a reference time setting means for setting a predetermined reference time interval; and an increase rate change means for changing an increase rate of the control command value by the initial hydraulic pressure control means in response to a difference between the time interval measured by the time measurement means and the reference time interval.

A nineteenth aspect of this invention is based on the eighteenth aspect thereof, and provides a control apparatus wherein the increase rate change means increases the increase rate as the time interval measured by the time measurement means is longer than the reference time interval.

A twentieth aspect of this invention is based on the nineteenth aspect thereof, and provides a control apparatus wherein the increase rate change means increases the increase rate by an amount proportional to the difference between the time interval measured by the time measurement means and the reference time interval.

A twenty-first aspect of this invention is based on the eighth aspect thereof, and provides a control apparatus wherein the transmission initial hydraulic pressure control command means comprises a learn correction means for learn-correcting a calculation condition of the control command value on the basis of an outcome of a transmission shift.

A twenty-second aspect of this invention is based on the twenty-first aspect thereof, and provides a control apparatus wherein the learn correction means comprises a time measurement means for measuring a time interval from a start of an increase in an initial hydraulic pressure to a start.of an inertia phase; a reference time setting means for setting a predetermined reference time interval; and a first slope change means for changing the first slope in response to a difference between the time interval measured by the time measurement means and the reference time interval.

A twenty-third aspect of this invention is based on the twenty-second aspect thereof, and provides a control apparatus wherein the first slope change means increases the first slope as the time interval measured by the time measurement means is longer than the reference time interval.

A twenty-fourth aspect of this invention is based on the twenty-third aspect thereof, and provides a control apparatus wherein the first slope change means increases the first slope by an amount proportional to the difference between the time interval measured by the time measurement means and the reference time interval.

A twenty-fifth aspect of this invention is based on the twenty-first aspect thereof, and provides a control apparatus wherein the learn correction means comprises a time measurement means for measuring a time interval from a start of an increase in an initial hydraulic pressure to a start of an inertia phase; a reference time setting means for setting a predetermined reference time interval; and a second slope change means for changing the second slope in response to a difference between the time interval measured by the time measurement means and the reference time interval.

A twenty-sixth aspect of this invention is based on the twenty-fifth aspect thereof, and provides a control apparatus wherein the second slope change means increases the second slope as the time interval measured by the time measurement means is longer than the reference time interval.

A twenty-seventh aspect of this invention is based on the twenty-sixth aspect thereof, and provides a control apparatus wherein the second slope change means increases the second slope by an amount proportional to the difference between the time interval measured by the time measurement means and the reference time interval.

A twenty-eighth aspect of this invention is based on the twenty-first aspect thereof, and provides a control apparatus wherein the learn correction means comprises a time measurement means for measuring a time interval from a start of an increase in an initial hydraulic pressure to a start of an inertia phase; a reference time setting means for setting a predetermined reference time interval; and a slope switch timing change means for changing the given time interval in response to a difference between the time interval measured by the time measurement means and the reference time interval.

A twenty-ninth aspect of this invention is based on the twenty-eighth aspect thereof, and provides a control apparatus wherein the slope switch timing change means shortens the given time interval as the time interval measured by the time measurement means is longer than the reference time interval.

A thirtieth aspect of this invention is based on the twenty-ninth aspect thereof, and provides a control apparatus wherein the slope switch timing change means shortens the given time interval by an amount proportional to the difference between the time interval measured by the time measurement means and the reference time interval.

DESCRIPTION OF THE PREFERRED EMBODIMENTS

First Embodiment

Figure 1:
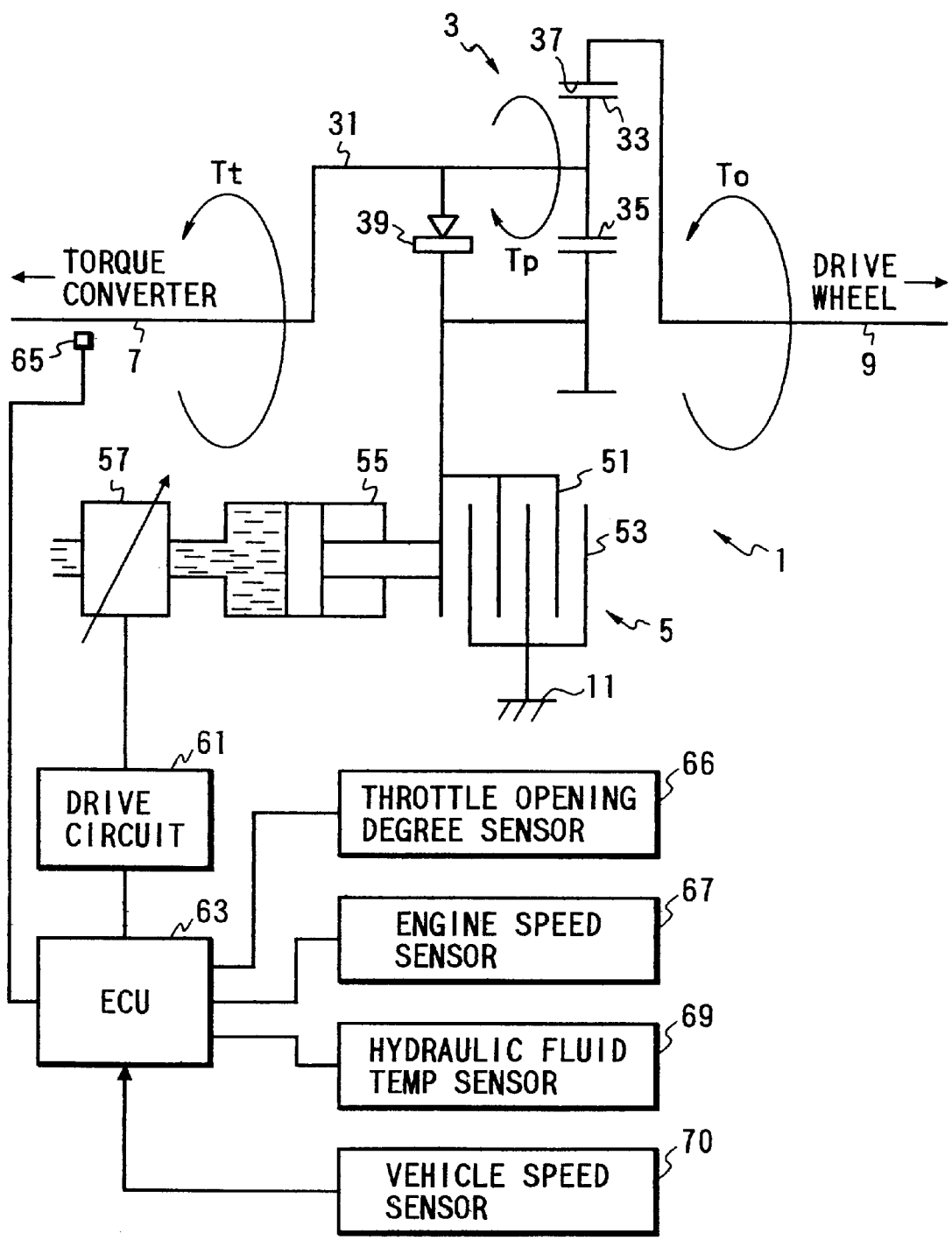
FIG. 1 is a diagram of a control apparatus for an automatic transmission according to a first embodiment of this invention.

With reference to FIG. 1, an automatic transmission 1 for an automotive vehicle includes a planetary gear train 3 and a clutch 5. The planetary gear train 3 serves as a means for changing a gear speed ratio. The clutch 5 forms a frictional engagement device.

The automatic transmission 1 also includes a rotatable input shaft 7 connected to the crankshaft of an engine (not shown) via a torque converter. The planetary gear train 3 has a carrier 31 connected to the input shaft 7. The carrier 31 rotates together with the input shaft 7.

The planetary gear train 3 also has a rotatable pinion gear 33, a rotatable sun gear 35, and a rotatable ring gear 37. The pinion gear 33 is mounted on an end of the carrier 31. The pinion gear 33 is located between the sun gear 35 and the ring gear 37. The sun gear 35 is connected to movable disks 51 in the clutch 5. The sun gear 35 rotates together with the clutch disks 51. The sun gear 35 is connected via a one-way clutch 39 to the carrier 31 so that the sun gear 35 will not rotate at a speed higher than a speed of rotation of the input shaft 7. The ring gear 37 is connected to an output shaft 9. The ring gear 37 rotates together with the output shaft 9. The output shaft 9 is connected via other gears (not shown) to vehicle driving wheels (not shown).

The clutch 5 has plates 53 fixed to a housing 11 of the automatic transmission 1. The clutch disks 51 can move into and out of engagement with the clutch plates 53. The clutch 5 assumes an engaged position when the clutch disks 51 move into engagement with the clutch plates 53. Specifically, the clutch 5 assumes a partially engaged position when the clutch disks 51 move into partial engagement with the clutch plates 53. The clutch 5 assumes a fully engaged position when the clutch disks 51 move into complete engagement with the clutch plates 53. The clutch 5 also has a hydraulic actuator or a hydraulic cylinder 55 for driving the clutch disks 51 toward and away from the clutch plates 53.

The hydraulic cylinder 55 has a working chamber, and a movable piston defining a part of the working chamber. Generally, the piston is urged by a return spring. The piston moves in response to the pressure in the working chamber. The piston of the hydraulic cylinder 55 is connected to the clutch disks 51. Accordingly, the clutch disks 51 move in response to the pressure in the working chamber of the hydraulic cylinder 55. As the pressure in the working chamber of the hydraulic cylinder 55 rises, the clutch disks 51 move into engagement with the clutch plates 53. As the pressure in the working chamber of the hydraulic cylinder 55 drops, the clutch disks 51 move out of engagement with the clutch plates 53.

A three-way electromagnetic valve 57 has a first port, a second port, and a third port. The first port of the electromagnetic valve 57 communicates with the working chamber of the hydraulic cylinder 55. The second port of the electromagnetic valve 57 communicates with a passage (a line-pressure feed passage) filled with pressurized hydraulic fluid having a line pressure PL. The third port of the electromagnetic valve 57 communicates with a drain passage leading to a hydraulic reservoir. The electromagnetic valve 57 is changeable between first and second positions. The electromagnetic valve 57 selectively connects the working chamber of the hydraulic cylinder 55 to either the line-pressure feed passage or the drain passage. When the electromagnetic valve 57 assumes the first position, the working chamber of the hydraulic cylinder 55 is connected to the line-pressure feed passage. In this case, the pressure (the hydraulic pressure) in the working chamber rises toward the line pressure PL. When the electromagnetic valve 57 assumes the second position, the working chamber of the hydraulic cylinder 55 is connected to the drain passage. In this case, the pressure (the hydraulic pressure) in the working chamber drops toward zero.

Generally, the electromagnetic valve 57 receives a binary drive signal having a given high frequency and a variable duty cycle (a variable duty factor). The electromagnetic valve 57 assumes the first and second positions when the drive signal is in first and second states (ON and OFF states) respectively. Accordingly, the electromagnetic valve 57 periodically changes between the first and second positions in response to the drive signal. The pressure in the working chamber of the hydraulic cylinder 55 depends on the duty cycle of the drive signal to the electromagnetic valve 57. Specifically, the pressure in the working chamber of the hydraulic cylinder 55 rises as the duty cycle of the drive signal to the electromagnetic valve 57 increases from 0% to 100%.

When the automatic transmission 1 is in a third-speed gear position in a "D" range, the pressure in the working chamber of the hydraulic cylinder 55 is held equal to zero so that the clutch disks 51 continue to be out of engagement with the clutch plates 53. In this case, as the input shaft 7 rotates in a direction Tt, the pinion gear 33 revolves in the same direction. Thus, the pinion gear 33 is subjected to a reactive force of turn on its own axis in a direction Tp opposite to the direction of the revolution. The one-way clutch 39 inhibits the turn of the pinion gear 33 on its own axis. Therefore, the pinion gear 33, the sun gear 35, the ring gear 37, and the output shaft 9 rotate together with the input shaft 9 in a direction To equal to the direction Tt and at a speed equal to the speed of the rotation of the input shaft 7. Thus, in this case, the automatic transmission 1 provides a speed change ratio of "1".

When an upshift of the automatic transmission 1 from the third-speed gear position to a fourth-speed gear position in the "D" range is required, the pressure in the working chamber of the hydraulic cylinder 55 is increased so that the clutch disks 51 move into engagement with the clutch plates 53. Thus, the sun gear 35 is inhibited from rotating. Therefore, in this case, the pinion gear 33 revolves in the direction Tt while turning on its own axis in the direction of the revolution. Accordingly, the ring gear 37 and the output shaft 9 rotate in the direction To and at a speed higher than the speed of the rotation of the input shaft 7. Thus, in this case, the automatic transmission 1 provides a speed change ratio greater than "1".

An electronic control unit (ECU) 63 serves to control the electromagnetic valve 57 via a drive circuit 61. Specifically, the electronic control unit 63 adjusts the duty cycle of the drive signal to the electromagnetic valve 57 via the drive circuit 61. The drive circuit 61 generates the drive signal in response to a control signal outputted from the electronic control unit 63, and feeds the generated drive signal to the electromagnetic valve 57.

A rotational speed sensor 65 associated with the input shaft 7 detects rotational speed Nt of the input shaft 7. The rotational speed sensor 65 outputs a signal representing the detected rotational speed Nt of the input shaft 7. A position sensor 66 connected to a throttle valve of the engine detects the degree TA of opening of the throttle valve, that is, the position of the throttle valve. The position sensor 66 outputs a signal representing the detected throttle opening degree TA. A rotational speed sensor 67 associated with the crankshaft or the camshaft of the engine detects rotational speed Ne of the crankshaft (that is, the rotational engine speed). The rotational speed sensor 67 outputs a signal 25 representing the detected engine speed Ne. A temperature sensor 69 disposed in the torque converter detects the temperature of hydraulic fluid in the torque converter. The temperature sensor 69 outputs a signal representing the detected hydraulic-fluid temperature. A speed sensor 70 mounted on the automotive vehicle detects the speed Vo of the body of the automotive vehicle. The speed sensor 70 includes, for example, a rotational speed sensor associated with the output shaft 9 of the automatic transmission 1. The speed sensor 70 outputs a signal representing the detected vehicle speed Vo. The electronic control unit 63 receives the output signals of the sensors 65, 66, 67, 69, and 70.

The electronic control unit 63 includes a combination of a CPU, a ROM, a RAM, and an input/output port. The electronic control unit 63 operates in accordance with a program stored in the ROM. The program has a main routine and subroutines. Specifically, the program has an upshift subroutine (an upshift segment) for controlling the electromagnetic valve 57 in response to the output signals of the sensors 65, 66, 67, 69, and 70 when the automatic transmission 1 is required to shift from the third-speed gear position to the fourth-speed gear position in the "D" range.

The program has another subroutine (another segment) for deciding which of the gear positions the automatic transmission 1 should assume in response to the detected vehicle operating conditions such as the detected throttle opening degree TA and the detected vehicle speed Vo. When the automotive vehicle falls into given operating conditions, this subroutine of the program generates a requirement for an upshift from the third-speed gear position to the fourth-speed gear position. The upshift subroutine of the program is started by the upshift requirement.

Figure 2:
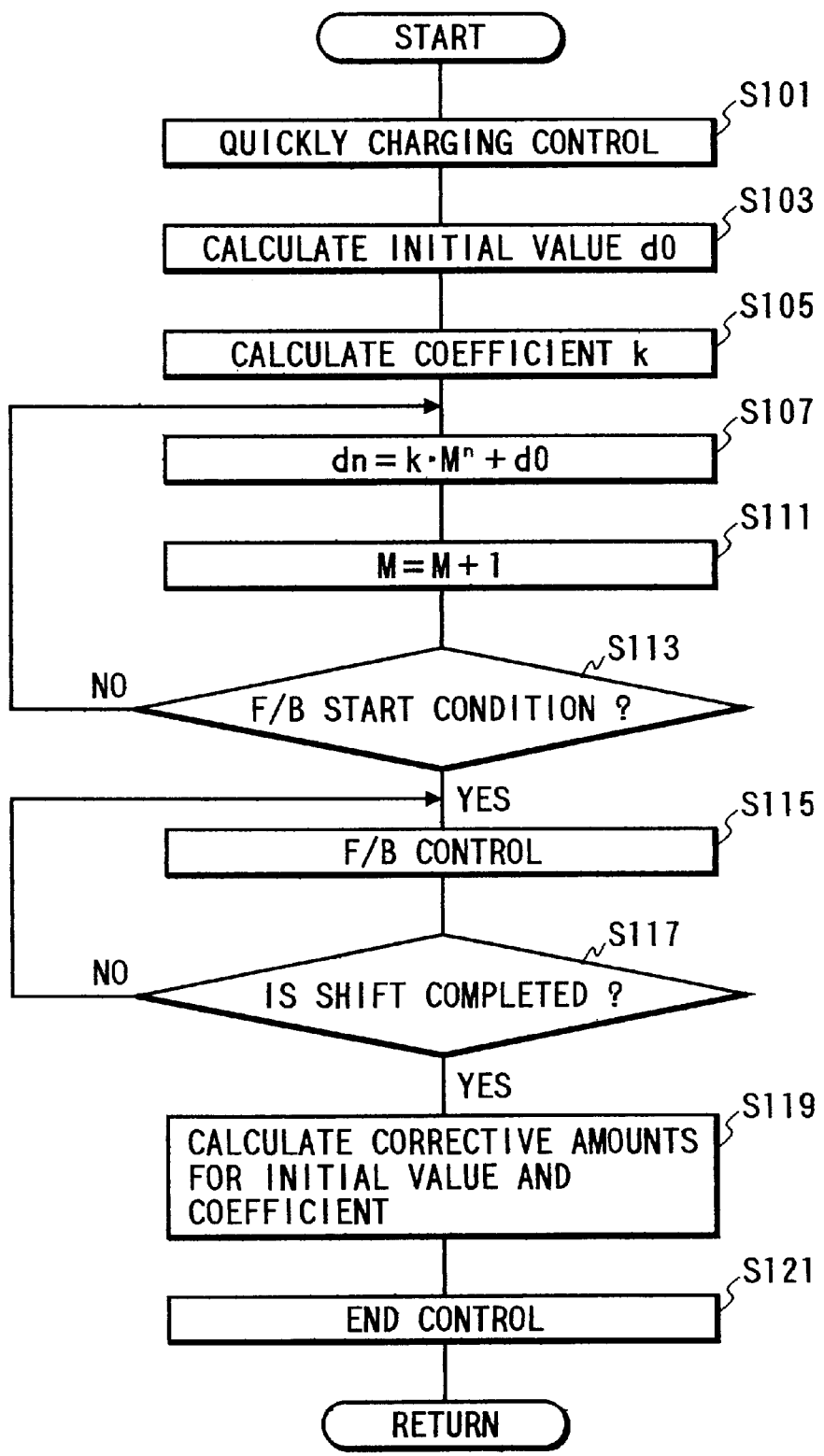
FIG. 2 is a flowchart of a segment of a program for an electronic control unit in FIG. 1.

FIG. 2 is a flowchart of the upshift segment (the upshift subroutine) of the program. As shown in FIG. 2, a first step S101 of the upshift segment of the program sets the duty cycle of the drive signal to the electromagnetic valve 57 to 100% at which the working chamber of the hydraulic cylinder 55 communicates with the line-pressure feed passage. The step S101 holds the duty cycle at 100% for a given time interval. As a result, the working chamber of the hydraulic cylinder 55 is quickly charged with pressurized hydraulic fluid. In addition, the pressure in the working chamber of the hydraulic cylinder 55 is quickly increased to a level enough to move the piston against the force of the return spring.

Figure 3:
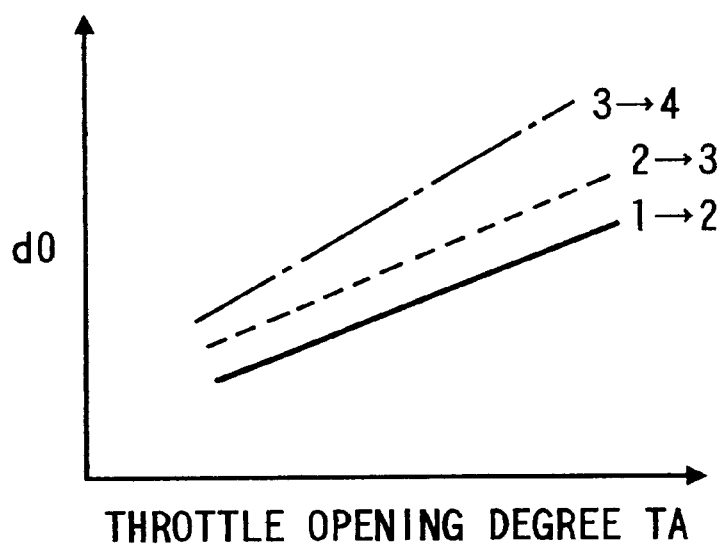
FIG. 3 is a diagram of a map providing the relation among an initial value "d0" of a command duty cycle, a throttle opening degree, and an upshift type in the first embodiment of this invention.

A step S103 following the step S101 decides an initial value "d0" of a command duty cycle or a desired duty cycle "dn" in response to the detected throttle opening degree TA by referring to a map shown in FIG. 3. The map in FIG. 3 is predetermined on the basis of the capacity of the clutch 5 and the characteristics of the electromagnetic valve 57., In FIG. 3, lines "1→2", "2→3", and "3→4" are assigned to an upshift from a first-speed gear position to a second-speed gear position, an upshift from the second-speed gear position to the third-speed gear position, and an upshift from the third-speed gear position to the fourth-speed gear position, respectively. In this case, the step S103 uses the line "3→4".

Figure 4:
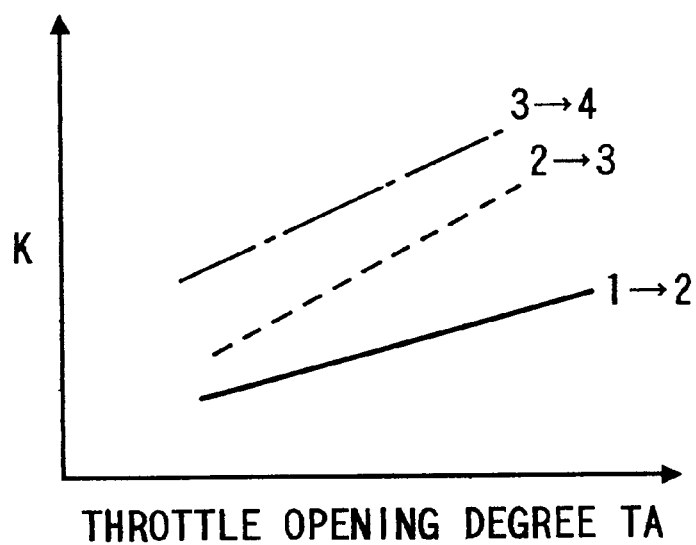
FIG. 4 is a diagram of a map providing the relation among a coefficient "k", a throttle opening degree, and an upshift type in the first embodiment of this invention.

A step S105 subsequent to the step S103 decides a coefficient "k" in response to the detected throttle opening degree TA by referring to a map shown in FIG. 4. In FIG. 4, lines "1→2", "2→3", and "3→4" are assigned to an upshift from the first-speed gear position to the second-speed gear position, an upshift from the second-speed gear position to the third-speed gear position, and an upshift from the third-speed gear position to the fourth-speed gear position, respectively. In this case, the step S105 uses the line "3→4". After the step S105, the program advances to a step S107.

The step S107 calculates the command duty cycle "dn" by referring to the following equation.

$$dn = k \cdot M^n + d0 \quad (1)$$

where "M" denotes a variable initialized to "0" at the start of the upshift segment of the program. Thus, the first execution of the step S107 sets the command duty cycle "dn" as "dn=d0". In the equation (1), "n" denotes a preset integer equal to or greater than "2". For example, the integer is equal to "2".

A step S111 following the step S107 increments the value "M" by "1". After the step S111, the program advances to a step S113.

The step S113 decides whether or not given conditions for implementing feedback (F/B) control are satisfied. When the given conditions are satisfied, the program advances from the step S113 to a step S115. When the given conditions are not satisfied, the program returns from the step S113 to the step S107. Therefore, the command duty cycle "dn" continues to be increased along an "n"-order curve until the given conditions are satisfied. The given conditions for implementing the feedback control are that the clutch 5 starts to be in the partially engaged position, and thus the command duty cycle "dn" can be controlled on a feedback basis. An example of the given conditions is that the detected input-shaft rotational speed Nt drops by a given value due to the movement of the clutch 5 into the partially engaged position.

The step S115 implements feedback (F/B) control of the command duty cycle "dn". Specifically, the step S115 calculates a rate ΔNt of a variation in the detected input-shaft rotational speed Nt. Then, the step S115 decides the command duty cycle "dn" in response to the variation rate ΔNt of the detected input-shaft rotational speed Nt so that the variation rate ΔNt will move toward a desired variation rate.

A step S117 subsequent to the step SI 15 decides whether or not the clutch 5 is in the fully engaged position, that is, whether or not the related upshift is completed. When the related upshift is completed, the program advances from the step S117 to a step S119. Otherwise, the program returns from the step S117 to the step S115. Therefore, the feedback control of the command duty cycle "dn" continues to be implemented until the related upshift is completed.

The step S119 calculates the time interval spent by the related upshift. In addition, the step S119 calculates a total controlled amount of the command duty cycle "dn" which is provided during the execution of the feedback control by the step S115. Then, the step S119 calculates a corrective quantity for the initial value "d0" and also a corrective quantity for the coefficient "k" from the calculated time interval and the calculates a total amount. The corrective quantities are designed to decrease the error between a target time interval and a calculated time interval available in a next execution cycle of the upshift segment of the program, and also to decrease a controlled amount available in the next execution cycle of the upshift segment of the program. It should be noted that the step S119 may update the initial value "d0" and the coefficient "k" in response to the calculated time interval and the calculated controlled amount.

A step S121 following the step S119 sets the command duty cycle "dn" to 100%. After the step S121, the current execution cycle of the upshift segment of the program ends and the program returns to the main routine.

The program has a segment (a subroutine) for controlling the electromagnetic valve 57 which is periodically executed. This program segment sets the duty cycle of the drive signal to the electromagnetic valve 57 to the command duty cycle "dn" available in the upshift segment of the program.

During a next execution cycle of the upshift segment of the program, the steps 103 and 107 use the sum of the initial value "d0" and the related corrective quantity as the initial value "d0" corresponding to a correction-resultant initial value "d'0". The correction-resultant initial value "d'0" is given as follows.

$$d'0 = d0 + d \cdot (Tact - Ttar) \quad (2)$$

where "d·(Tact−Ttar)" denotes the corrective quantity; "Tact" denotes the time interval spent by the upshift; and "Ttar" denotes a target time interval spent by an upshift. During the next execution cycle of the upshift segment of the program, the steps 105 and 107 use the sum of the coefficient "k" and the related corrective quantity as the coefficient "k" corresponding to a correction-resultant coefficient.

Figure 5:
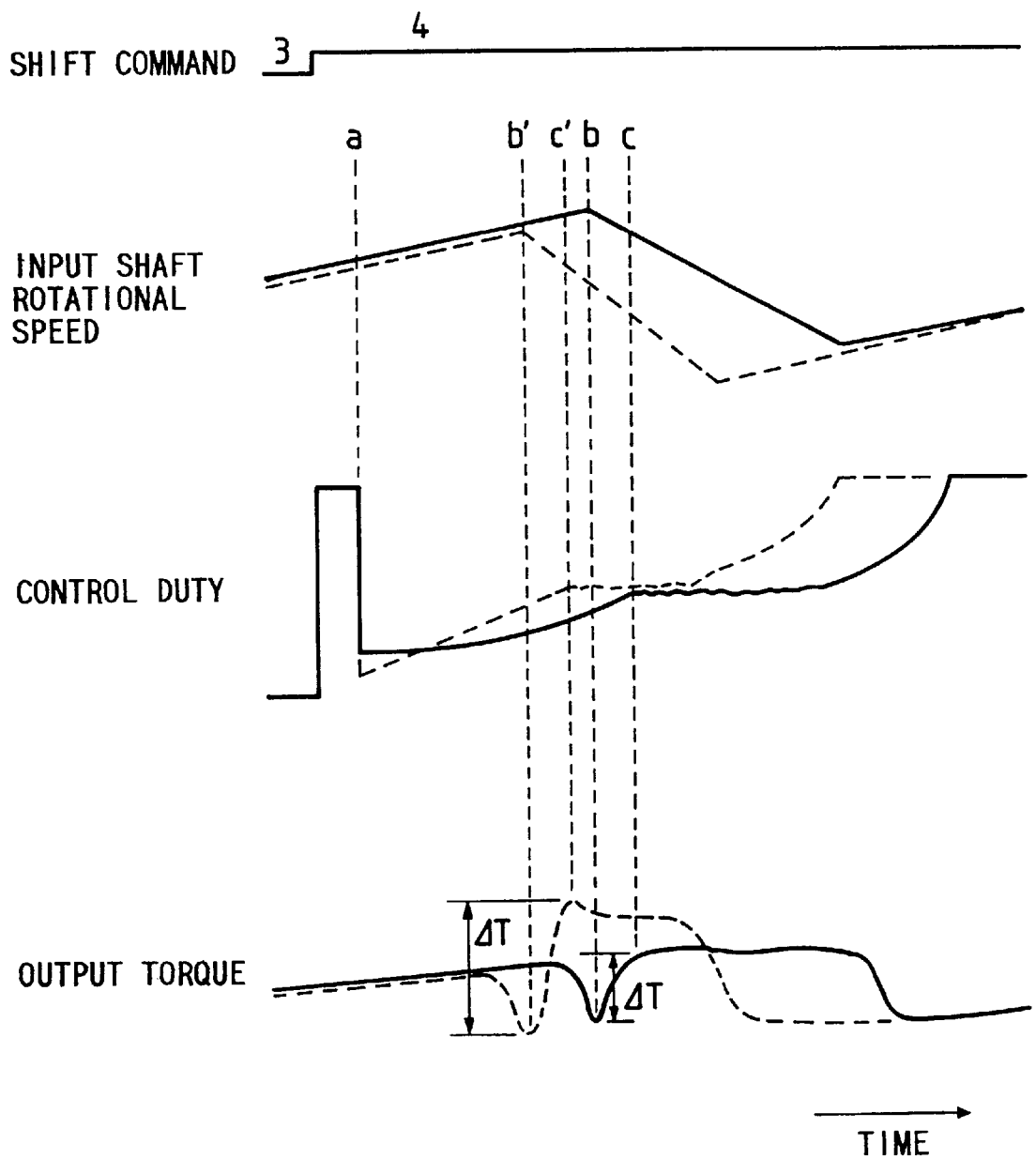
FIG. 5 is a time-domain diagram of a required gear position of an automatic transmission, an input-shaft rotational speed, a duty cycle, and an output torque in the first embodiment of this invention.

With reference to FIG. 5, a process of quickly charging the working chamber of the hydraulic cylinder 55 with pressurized hydraulic fluid is started at a moment of the occurrence of a requirement for an upshift from the third-speed gear position to the fourth-speed gear position. The quickly charging process is implemented by the step S101 in FIG. 2. As shown in FIG. 5, at a subsequent moment "a", the quickly charging process ends. At a moment "c" following the moment "a", the duty cycle "dn" becomes controllable on a feedback basis. During the time interval between the moments "a", and "c", the duty cycle "dn" increases along an n-order curve. Specifically, the duty cycle "dn" monotonically increases at a rate which gradually rises in accordance with the lapse of time. As will be explained later, this increase in the duty cycle "dn" compensates for the deviation of the line pressure PL of hydraulic fluid from a desired level and also the deviation of the characteristics of the electromagnetic valve 57 from desired characteristics.

In the case where the line pressure PL of hydraulic fluid is relatively high and hence an inertia phase starts (a moment "b") while the duty cycle "dn" is small, the rate (the slope of the increasing curve) of a variation in the duty cycle "dn" is relatively small during the time interval from the moment "b" of the start of the inertia phase to the moment "c" of the satisfaction of the given conditions for the feedback control. On the other hand, in the case where the line pressure PL of hydraulic fluid is relatively low and hence the inertia phase starts when the duty cycle "dn" is relatively great, the rate (the slope of the increasing curve) of a variation in the duty cycle "dn" is relatively great during the time interval from the moment "b" of the start of the inertia phase to the moment "c" of the satisfaction of the given conditions for the feedback control.

Thus, at the moment "b" of the start of the inertia phase, the hydraulic pressure applied to the hydraulic cylinder 55 in the clutch 5 is approximately constant independent of the line pressure PL of hydraulic fluid. The variation rate of the duty cycle "dn" which occurs at the moment "b" is equal to a value corresponding to the duty cycle "dn" available at the start of the inertia phase. Accordingly, during the time interval between the moments "b" and "c", the variation in the hydraulic pressure applied to the hydraulic cylinder 55 in the clutch 5 is substantially independent of the line pressure PL of hydraulic fluid and the characteristics of the electromagnetic valve 57.

As the line pressure PL of hydraulic fluid rises, a variation in the duty cycle "dn" more affects the hydraulic pressure applied to the hydraulic cylinder 55 in the clutch 5. On the other hand, as the line pressure PL of hydraulic fluid rises, the variation rate of the duty cycle "dn" decreases. Thus, it is possible to reduce a variation $\Delta T$ in a torque (an output torque) To which appears on the output shaft 9 during an upshift from the third-speed gear position to the fourth-speed gear position. Accordingly, it is possible to adequately suppress a shock upon an upshift from the third-speed gear position to the fourth-speed gear position.

A comparative design is now assumed in which the duty cycle "dn" continues to be linearly increased until the start of the inertia phase. The input-shaft rotational speed, the duty cycle "dn", and the output torque available in the comparative design are shown by the broken lines in FIG. 5. In the comparative design, the inertia phase starts at a moment b', and the duty cycle "dn" becomes controllable on a feedback basis at a moment c'. In the comparative design, during the time interval between the moments b' and c', the hydraulic pressure applied to the hydraulic cylinder 55 in the clutch 5 reflects the line pressure PL of hydraulic fluid and the characteristics of the electromagnetic valve 57. Thus, in the comparative design, when the line pressure PL of hydraulic fluid is high, the variation $\Delta T$ in the output torque To upon an upshift tends to be great (see FIG. 5).

Figure 6:
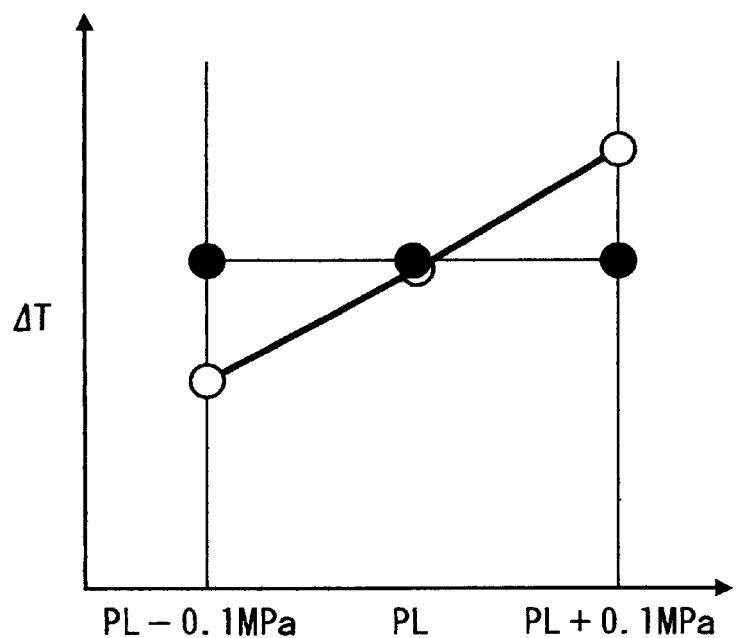
FIG. 6 is a diagram of the relation between a line pressure PL of hydraulic fluid and a variation ΔT in an output torque in the first embodiment of this invention, and also the corresponding relation in a comparative design.

With reference to FIG. 6, the black circles and the lines connecting them denote the relation between the line pressure PL of hydraulic fluid and the variation $\Delta T$ in the output torque To which is available in the first embodiment of this invention. On the other hand, the white circles and the lines connecting them denote the relation between the line pressure PL of hydraulic fluid and the variation $\Delta T$ in the output torque To which is available in the comparative design. According to the first embodiment of this invention, the variation $\Delta T$ in the output torque To is substantially independent of the line pressure PL of hydraulic fluid. On the other hand, in the comparative design, the variation $\Delta T$ in the output torque To reflects the line pressure PL of hydraulic fluid.

As understood from the previous description, the step S119 corrects the initial value "d0" and the coefficient "k" in response to the upshift time interval and the feedback-controlled amount on the basis of a learning process. Regarding the control of the duty cycle "dn", the corrective function of the step S119 compensates for a variation in the characteristics of the electromagnetic valve 57 due to ageing.

As previously described, the initial value "d0" is predetermined on the basis of the capacity of the clutch 5 and the characteristics of the electromagnetic valve 57. This setting of the initial value "d0" enables reliable control of the duty cycle "dn".

The "n"-order curve along which the duty cycle "dn" increases may be replaced by one of other monotonically increasing curves such as exponential function curves.

Figure 7:
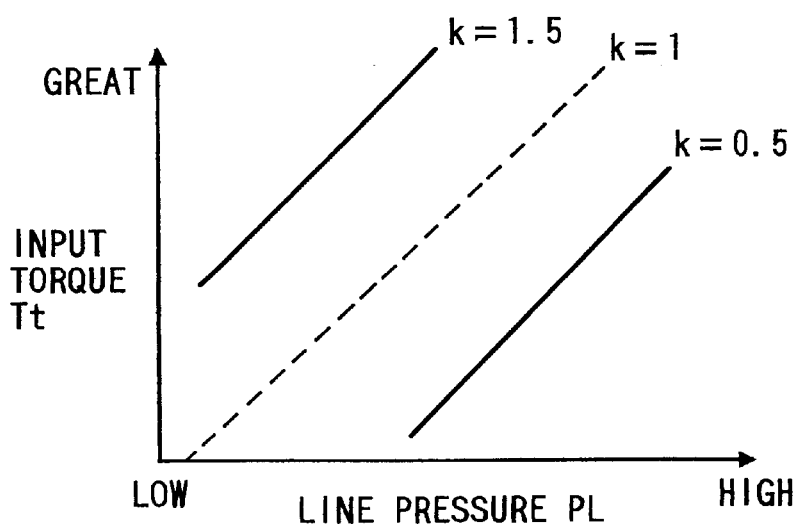
FIG. 7 is a diagram of a map providing the relation among a coefficient "k", a line pressure PL of hydraulic fluid, and an input torque Tt first embodiment of this invention.

The coefficient "k" may be decided in response to the line pressure PL of hydraulic fluid and an input torque Tt by referring to a map shown in FIG. 7. To effectively suppress a shock upon a gear shift, it is desirable that the duty cycle "dn" decreases as the line pressure PL of hydraulic fluid increases. To shorten the time interval spent by a gear shift, it is desirable that the rate of variation in the duty cycle "dn" rises as the input torque Tt increases. The map in FIG. 7 is designed to satisfy these desirable conditions.

It is preferable that maps similar to that in FIG. 7 are provided for gear shifts of different types respectively. The gear shifts of the different types include, for example, an upshift from the first-speed gear position to the second-speed gear position and an upshift from the second-speed gear position to the third-speed gear position. Generally, the input torque Tt is estimated in response to the detected engine speed Ne and the detected hydraulic-fluid temperature represented by the output signals of the rotational speed sensor 67 and the temperature sensor 69 respectively. Specifically, a capacity coefficient "C" related to the torque converter is calculated from the detected hydraulic-fluid temperature. Then, the input torque Tt is calculated from the capacity coefficient "C" and the detected engine speed Ne according to the following equation.

$$Tt = K \cdot C \cdot Ne \cdot Ne \qquad (3)$$

where "K" denotes a given constant.

Figure 8:
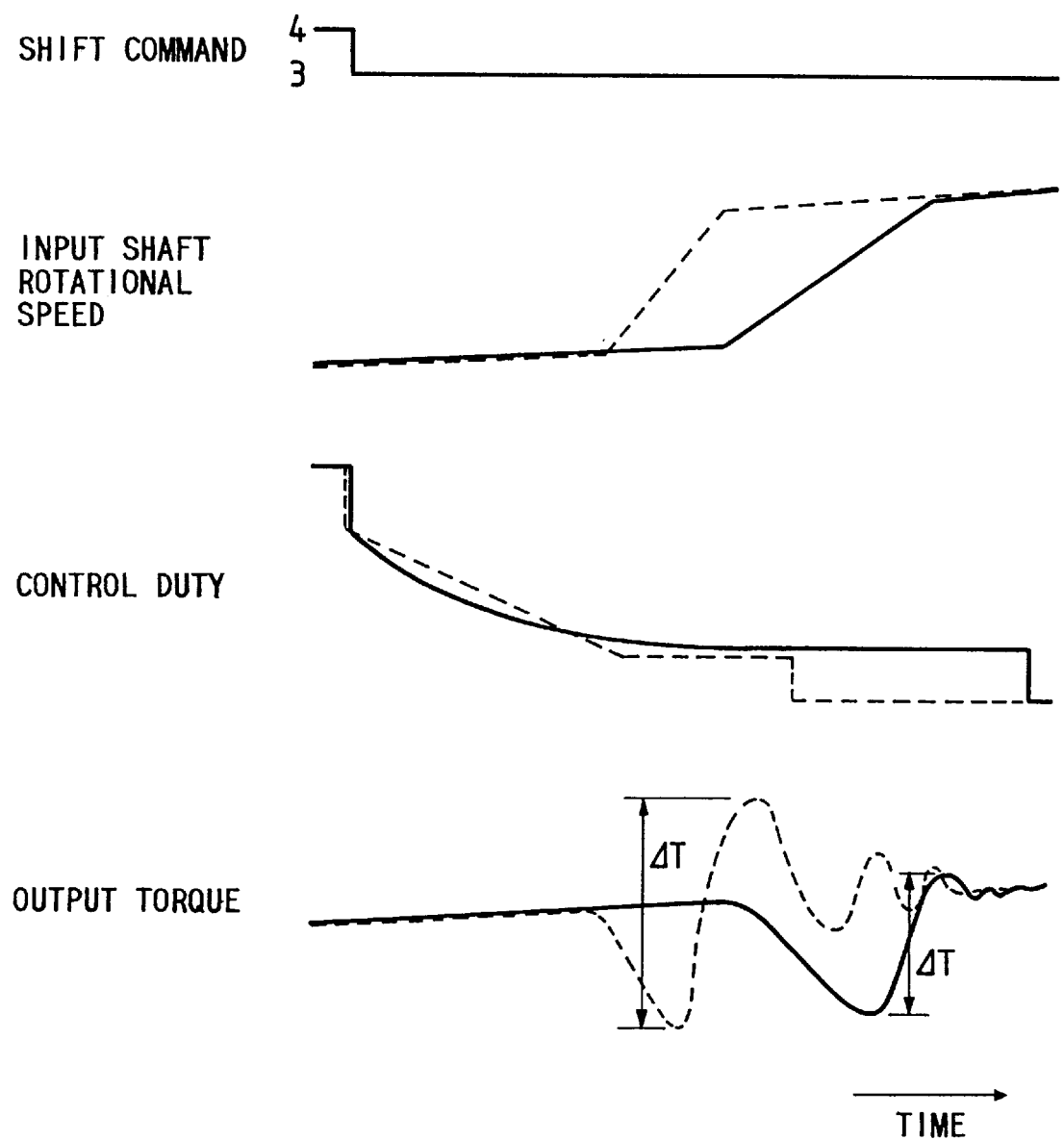
FIG. 8 is a time-domain diagram of a required gear position of an automatic transmission, an input-shaft rotational speed, a duty cycle, and an output torque in the first embodiment of this invention.

Similar control of the duty cycle "dn" may also be applied to a downshift from the fourth-speed gear position to the third-speed gear position. With reference to FIG. 8, the duty cycle "dn" is reduced at a moment of the occurrence of a requirement for a downshift from the fourth-speed gear position to the third-speed gear position. Then, the duty cycle "dn" is decreased along a monotonically decreasing curve in accordance with the lapse of time. Specifically, the duty cycle "dn" monotonically decreases at a rate which gradually drops in accordance with the lapse of time.

The hydraulic pressure applied to the hydraulic cylinder 55 in the clutch 5 falls as the duty cycle "dn" decreases. As a result, the clutch 5 starts to move out of the fully engaged position while the input-shaft rotational speed Nt starts to rise at a great rate. In the case where the line pressure PL of hydraulic fluid is relatively high, the clutch 5 starts to move out of the fully engaged position when the duty cycle "dn" reaches a relatively small value. Accordingly, in this case, the rate of variation (the slope of the curve) in the duty cycle "dn" at the start of movement of the clutch 5 from the fully engaged position is relatively small. In the case where the line pressure PL of hydraulic fluid is relatively low, the clutch 5 starts to move out of the fully engaged position when the duty cycle "dn" reaches a relatively great value. Accordingly, in this case, the rate of variation (the slope of the curve) in the duty cycle "dn" at the start of movement of the clutch 5 from the fully engaged position is relatively great. The level of the hydraulic pressure in the hydraulic cylinder 55 of the clutch 5 at which the clutch 5 starts to move out of the fully engaged position is substantially constant independent of the line pressure PL of hydraulic fluid. After the clutch 5 starts to move out of the fully engaged position, the rate of variation in the duty cycle "dn" depends on the hydraulic-fluid line pressure PL. Thus, it is possible to suitably control the hydraulic pressure in the hydraulic cylinder 55 of the clutch 5 after the start of movement of the clutch 5 from the fully engaged position. Therefore, it is possible to reduce a variation $\Delta T$ in the output torque To which appears on the output shaft 9 during a downshift from the fourth-speed gear position to the third-speed gear position. Accordingly, it is possible to adequately suppress a shock upon a downshift from the fourth-speed gear position to the third-speed gear position. Furthermore, it is possible to compensate for a variation in the characteristics of the electromagnetic valve 57.

A comparative design is now assumed in which the duty cycle "dn" is linearly decreased in accordance with the lapse of time. The input-shaft rotational speed, the duty cycle "dn", and the output torque available in the comparative design are shown by the broken lines in FIG. 8. In the comparative design, after the clutch 5 starts to move out of the fully engaged position, the hydraulic pressure applied to the hydraulic cylinder 55 in the clutch 5 reflects the line pressure PL of hydraulic fluid and the characteristics of the electromagnetic valve 57. Thus, in the comparative design, the variation ΔT in the output torque To during a downshift tends to be great (see FIG. 8).

The first embodiment of this invention may be modified into a structure in which an upshift and a downshift are implemented by moving the clutch 5 out of and into the fully engaged position respectively.

Second Embodiment

Figure 9:
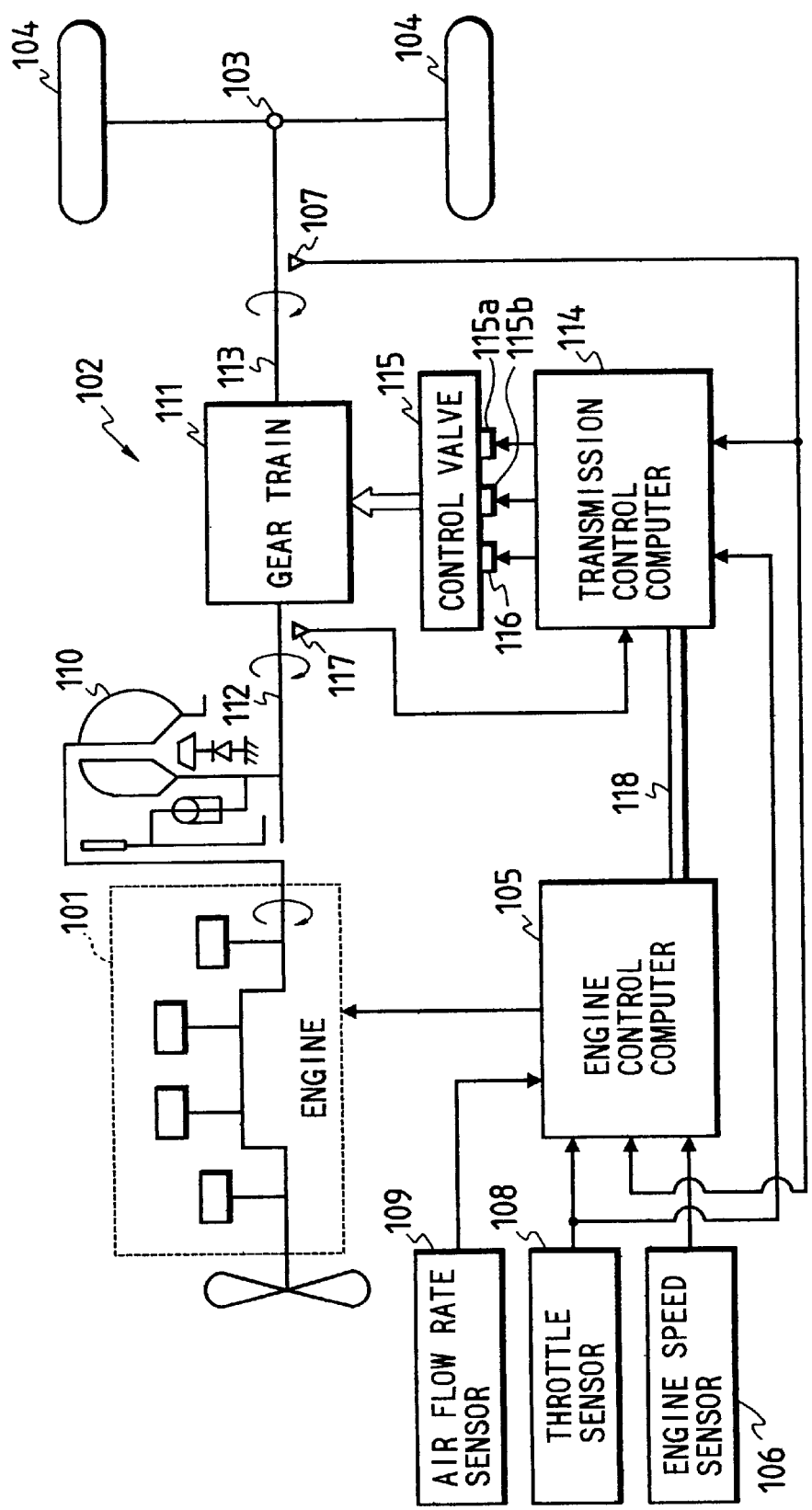
FIG. 9 is a diagram of a control apparatus for an automatic transmission according to a second embodiment of this invention.

With reference to FIG. 9, an electronically controlled engine 101 is connected via an automatic transmission 102 and a differential gear 103 to vehicle driving wheels 104. An engine controlling computer 105 is connected to the electronically controlled engine 101.

A rotational speed sensor 106 associated with the crankshaft or the camshaft of the electronically controlled engine 101 detects rotational speed Ne of the crankshaft (that is, the rotational engine speed). The rotational speed sensor 106 outputs a signal representing the detected engine speed Ne. A speed sensor 107 mounted on the automotive vehicle detects the speed Nos of the body of the automotive vehicle. Generally, the speed sensor 107 includes a rotational speed sensor associated with the output shaft 113 of the automatic transmission 102 which detects rotational speed of the output shaft 113 as an indication of the speed Nos of the body of the related vehicle. The speed sensor 107 outputs a signal representing the detected vehicle speed Nos. A position sensor 108 connected to a throttle valve of the electronically controlled engine 101 detects the degree θacc of opening of the throttle valve, that is, the position of the throttle valve. The position sensor 108 outputs a signal representing the detected throttle opening degree θacc. An air flow rate sensor 109 disposed in an air induction passage of the electronically controlled engine 101 detects the rate of air flow into the combustion chambers of the engine 101. The air flow rate sensor 109 outputs a signal representing the detected air flow rate. The engine controlling computer 105 receives the output signals of the sensors 106, 107, 108, and 109.

The engine controlling computer 105 decides a command fuel injection rate (a desired fuel injection rate) in response to the information pieces represented by the output signals of the sensors 106, 107, 108, and 109. The engine controlling computer 105 drives a fuel injection device in the electronically controlled engine 101 in response to the command fuel injection rate. Furthermore, the engine controlling computer 105 decides a command spark timing (a desired spark timing) in response to the information pieces represented by the output signals of the sensors 106, 107, 108, and 109. The engine controlling computer 105 drives an ignition device in the electronically controlled engine 101 in response to the command spark timing.

Figure 10:
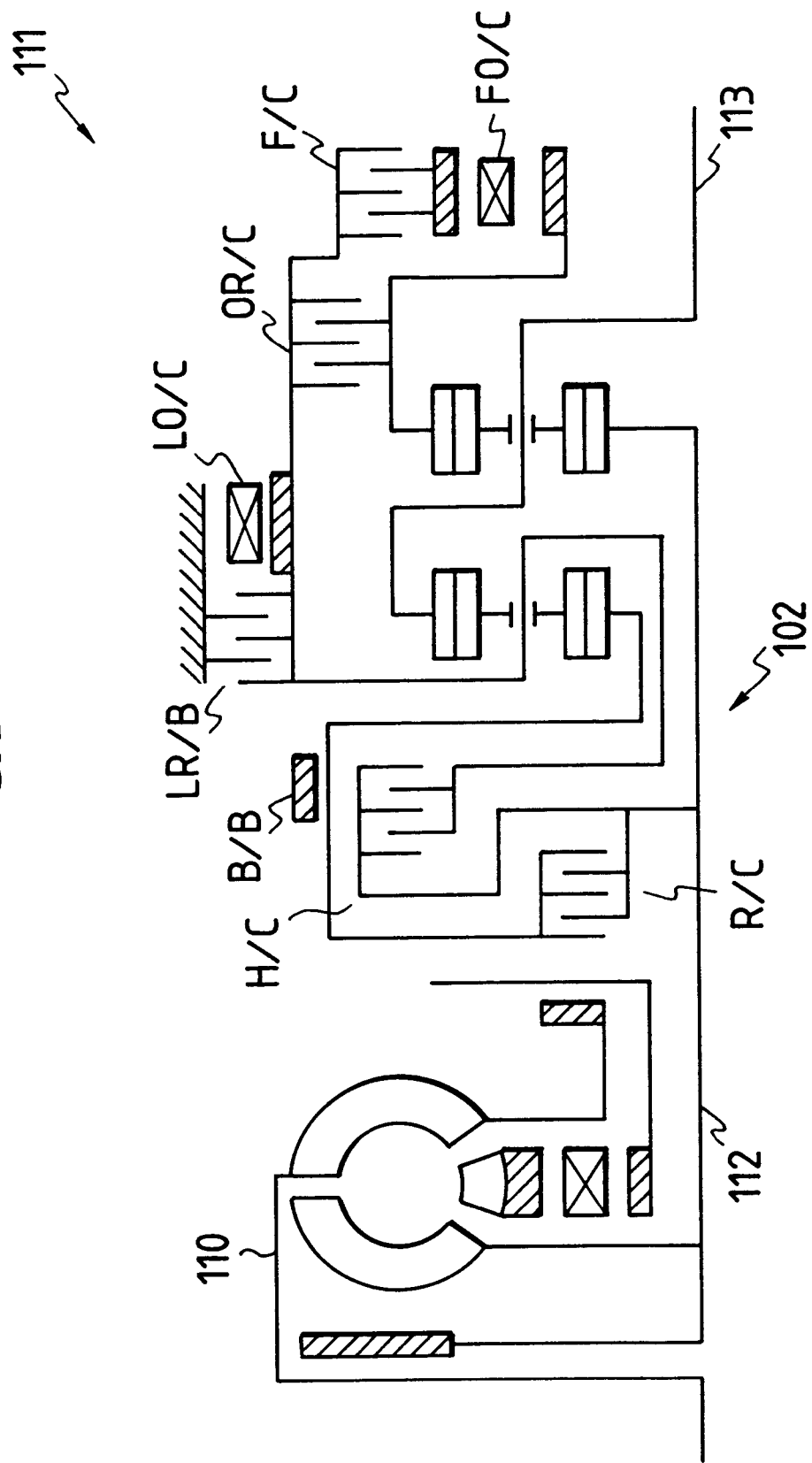
FIG. 10 is a diagram of a speed-ratio changing gear train in FIG. 9.

The automatic transmission 102 includes a torque converter 110 and a speed-ratio changing gear train 111. As shown in FIG. 10, the speed-ratio changing gear train 111 includes hydraulically-operated frictional engagement devices of various types such as a high clutch H/C, a reverse clutch R/C, a low one-way clutch LO/C, an overrun clutch OR/C, a forward clutch F/C, a forward one-way clutch FO/C, a band brake B/B, and a low reverse brake LR/B. Generally, the speed-ratio changing gear train 111 is of a known type. Upon a gear position shift of the automatic transmission 102, one or more of the frictional engagement devices are selected and actuated in accordance with the type of the gear position shift. To this end, the automatic transmission 102 is supplied with hydraulic pressures via a control valve 115 in response to commands fed from a transmission controlling computer 114.

As shown in FIG. 9, the control valve 115 includes solenoid valves 115a, 115b, and 116. To implement a shift of the automatic transmission 102 from one gear position to another, the solenoid valves 115a and 115b change hydraulic-pressure supply paths in response to commands from the transmission controlling computer 114. Each of the gear-position controlling solenoid valves 115a and 115b can be changed between an ON position and an OFF position. The solenoid valve 116 controls the line pressure PL of hydraulic fluid. It should be noted that the gear-position controlling solenoid valves 115a and 115b may be replaced by three or more solenoid valves in accordance with the number of different gear positions of the automatic transmission 102 and the internal structure of a main portion of the control valve 115. Furthermore, the control valve 115 may be provided with an additional solenoid valve which adjusts the timing of quickly charging the control valve 115 with hydraulic fluid or the timing of quickly discharging hydraulic fluid from the control valve 115. The line-pressure controlling solenoid valve 116 is powered by a drive signal having a fixed high frequency and a variable duty cycle. Alternatively, the line-pressure controlling solenoid valve 116 may be replaced by another solenoid valve such as a linear solenoid valve which is able to linearly vary the line pressure PL of hydraulic fluid. Generally, the line-pressure controlling solenoid valve 116 is connected among a hydraulic pump, a line-pressure regulator, and a drain passage. In this case, the line-pressure controlling solenoid valve 116 adjusts the ratio between the rate of the escape flow of hydraulic fluid to the drain passage and the rate of the effective flow of hydraulic fluid via the line-pressure regulator, thereby controlling the line pressure PL of hydraulic fluid.

Figure 11:
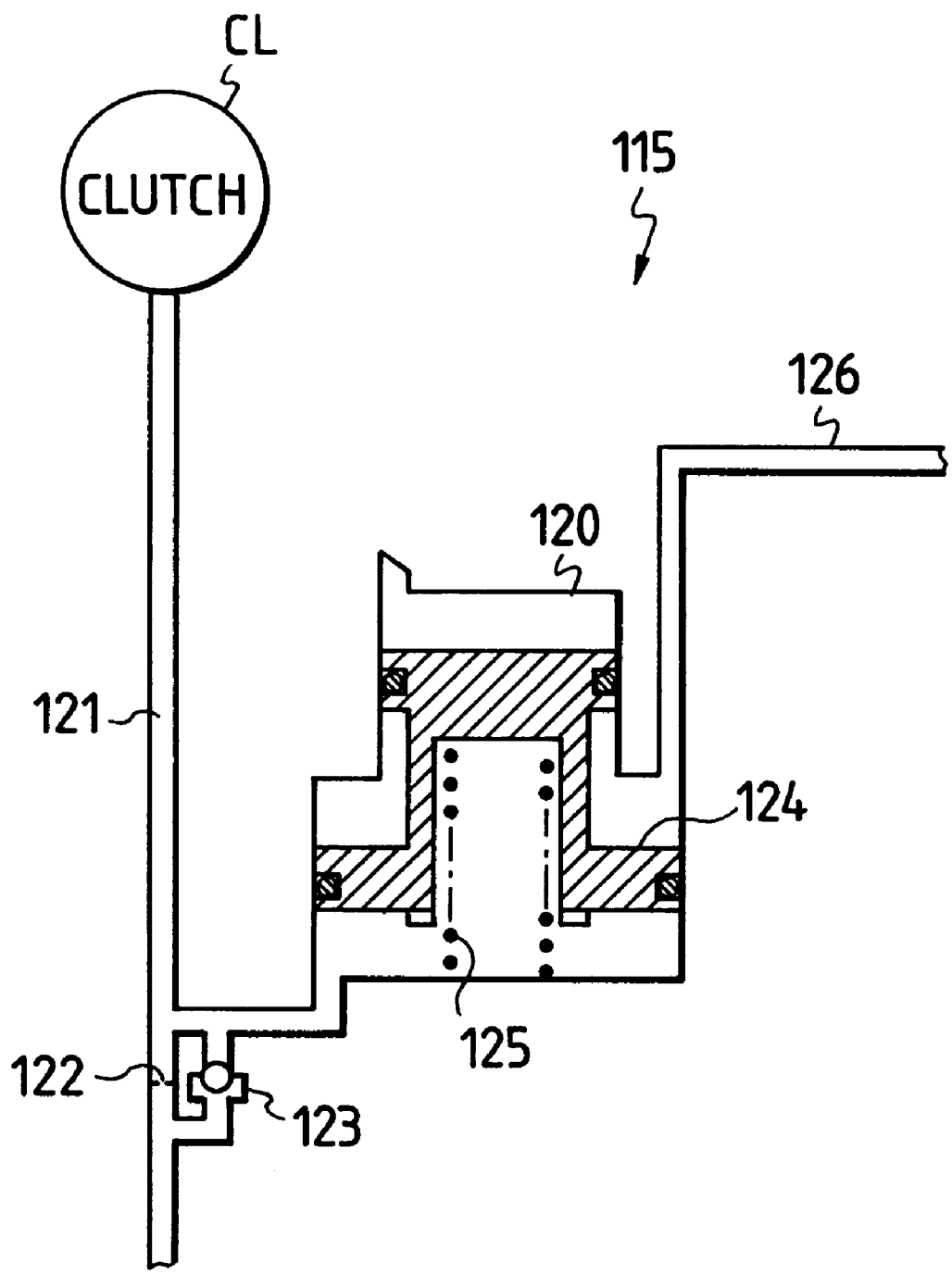
FIG. 11 is a diagram of a portion of a control valve in FIG. 9.

As shown in FIG. 11, the control valve 115 includes an accumulator 120. The accumulator 120 is provided in a passage 121 for feeding hydraulic fluid (working fluid) to a clutch CL in the speed-ratio changing gear train 110. An orifice or a flow restriction 122 is disposed in the passage 121. The inlet of a check valve 123 is connected to a region of the passage 121 downstream of the orifice 122 while the outlet thereof is connected to a region of the passage 121 upstream of the orifice 122. The accumulator 120 is connected to a region of the passage 121 downstream of the orifice 122 and the check valve 123. The accumulator 120 includes a piston 124 coaxially and slidably disposed in a stepped bore, and a coil spring 125 urging the piston 124 in an upward axial direction. A lower end of the piston 124 has a larger-diameter portion whose back surface (upper surface) is continuously subjected via a passage 126 to a hydraulic pressure originating from the line pressure PL of hydraulic fluid. The force of the coil spring 125 is set weaker than a force caused by the line pressure PL applied to the piston 124 via the passage 126.

In the case where the control valve 115 feeds the hydraulic fluid to the clutch CL, the accumulator 120 controls the hydraulic pressure in the clutch CL after the passage 121 is fully charged with the hydraulic fluid. As will be explained later, the line pressure PL of hydraulic fluid is controlled before the start of feedback control. Specifically, the line pressure of hydraulic fluid is increased along a curve before the start of feedback control.

With reference back to FIG. 9, a rotational speed sensor 117 associated with the input shaft 112 of the automatic transmission 102 detects rotational speed Nt of the input shaft 112. The rotational speed sensor 117 outputs a signal representing the detected rotational speed Nt of the input shaft 112.

The transmission controlling computer 114 receives the output signals of the sensors 107, 108, and 117. The transmission controlling computer 114 includes a microcomputer having a combination of a CPU, a ROM, a RAM, and an input/output port. The transmission controlling computer 114 operates in accordance with a program stored in the-ROM. According to the program, the transmission controlling computer 114 decides whether or not given conditions for implementing an upshift or a downshift are satisfied in response to the information pieces represented by the output signals of the sensors 107, 108, and 117. In addition, the transmission controlling computer 114 sets a command line pressure (a desired line pressure) of hydraulic fluid in response to the information pieces represented by the output signals of the sensors 107, 108, and 117.

The engine controlling computer 105 and the transmission controlling computer 114 are connected to each other via a communication line 118. Control information and control commands can be bi-directionally transmitted between the engine controlling computer 105 and the transmission controlling computer 114 via the communication line 118. The communication line 118 uses a multiplexed communication arrangement such as a LAN (local area network). The communication line 118 may be a simple line connected between the input/output ports of the engine controlling computer 105 and the transmission controlling computer 114.

Figure 12:
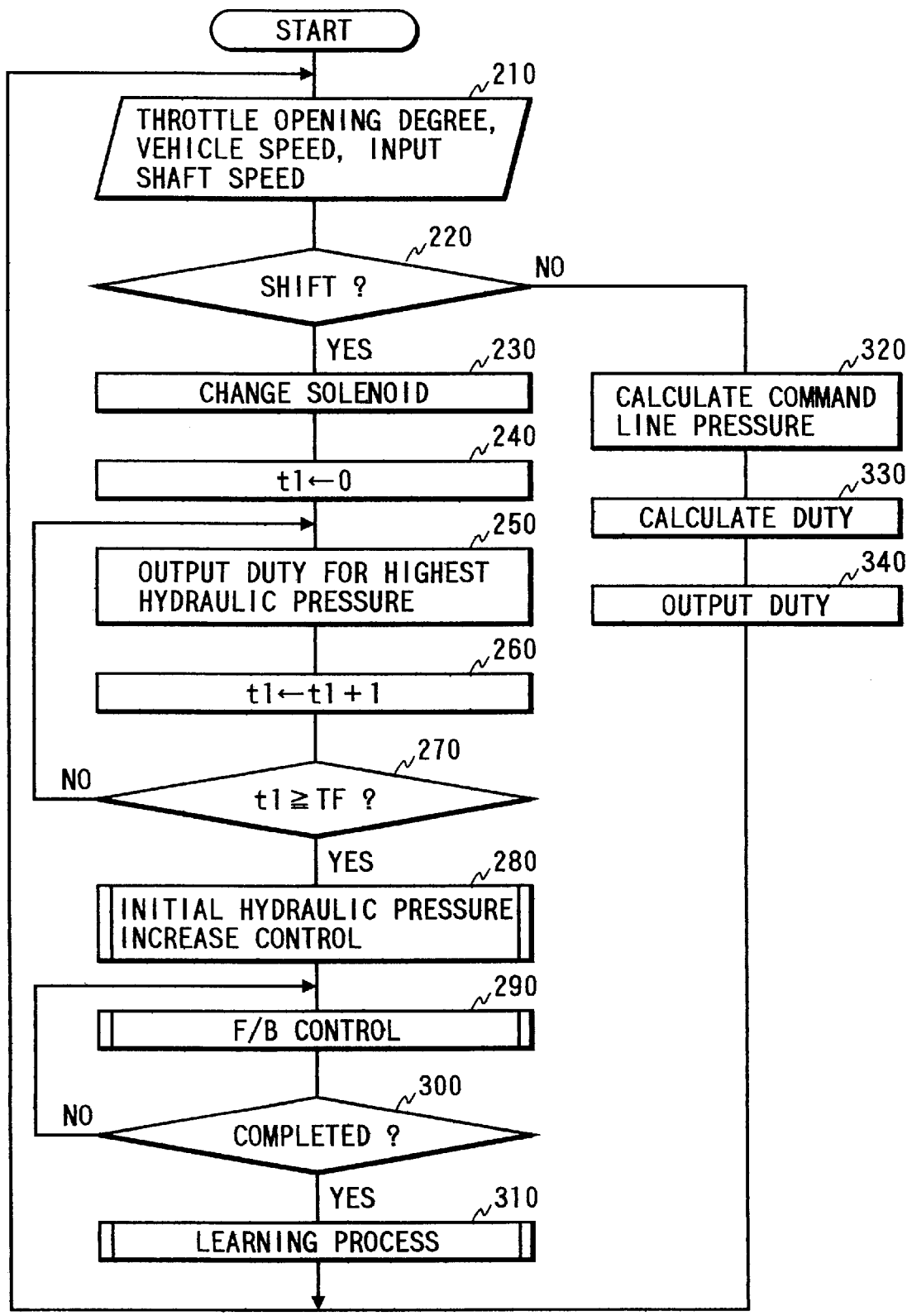
FIG. 12 is a flowchart of a segment of a program for a transmission controlling computer in FIG. 9.

FIG. 12 is a flowchart of a segment of the program related to the transmission controlling computer 114. As shown in FIG. 12, a first step 210 of the program segment derives the current throttle opening degree θacc from the output signal of the position sensor 108. In addition, the step 210 derives the current vehicle speed Nos from the output signal of the speed sensor 107. Furthermore, the step 210 derives the current input-shaft rotational speed Nt from the output signal of the rotational speed sensor 117.

A step 220 following the step 210 decides whether or not a shift (an upshift) is required in response to the current throttle opening degree θacc and the current vehicle speed Nos. This decision uses a map shown in FIG. 13. The ROM in the transmission controlling computer 114 stores information of the map in FIG. 13.

Figure 13:
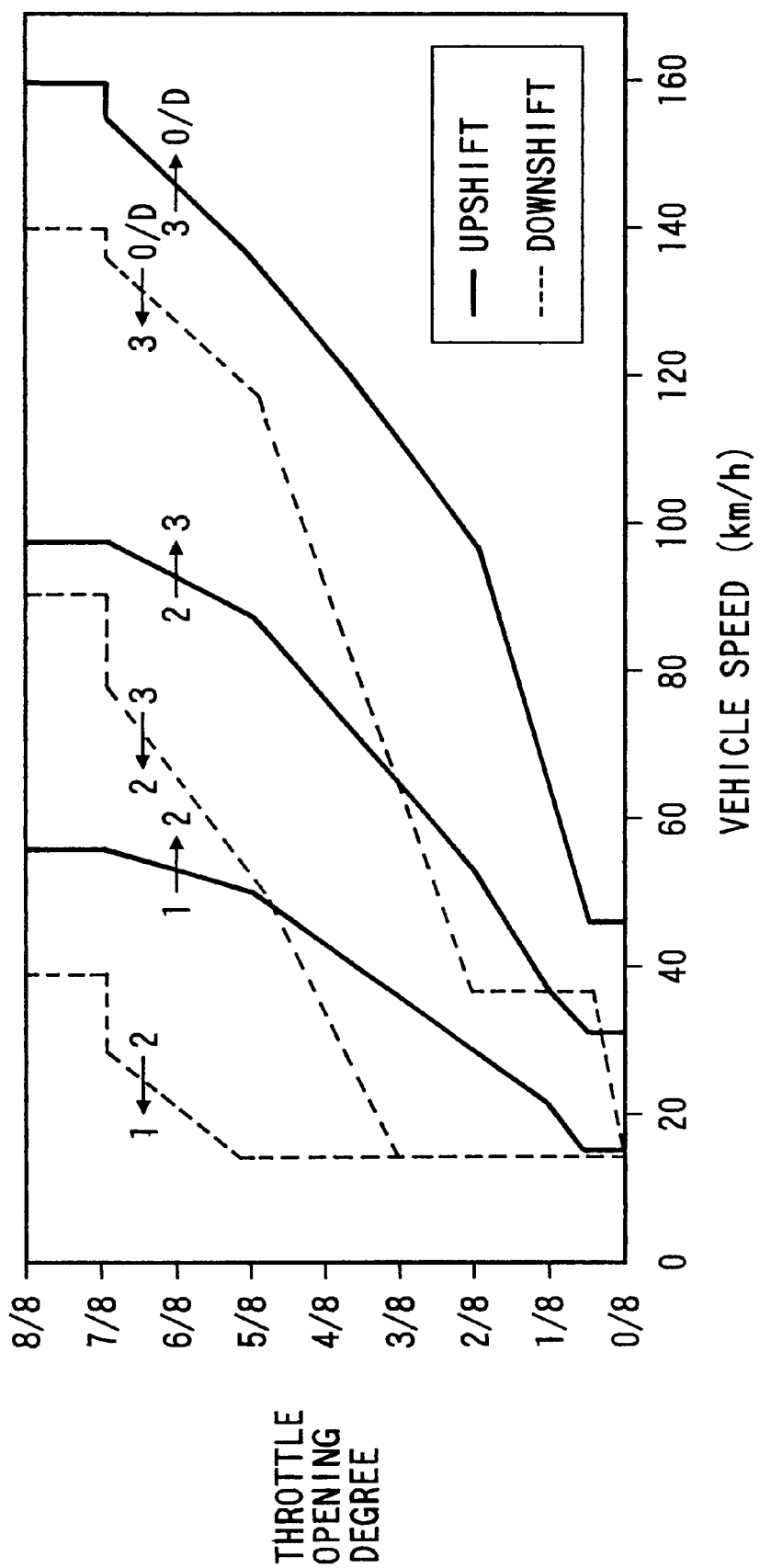
FIG. 13 is a diagram of a map providing ranges of different gear positions of an automatic transmission with respect to a throttle opening degree and a vehicle speed in the second embodiment of this invention.

The map in FIG. 13 provides ranges of different gear positions of the automatic transmission 102 which are separated from each other by boundaries. In FIG. 13, the solid lines denote boundaries used for upshifts such as a "1→2" upshift (an upshift from a first-speed gear position to a second-speed gear position) and a "2→3" upshift (an upshift from the second-speed gear position to a third-speed gear position). In FIG. 13, the broken lines denote boundaries used for downshifts such as a "1←2" downshift (a downshift to the first-speed gear position from the second-speed gear position) and a "2←3" downshift (a downshift to the second-speed gear position from the third-speed gear position). The upshift boundaries are offset from the corresponding downshift boundaries to prevent chattering on control of the gear position of the automatic transmission 102.

The step 220 calculates the position of the current throttle opening degree θacc and the current vehicle speed Nos in the map of FIG. 13. The step 220 calculates the line connecting the position of the current throttle opening degree θacc and the current vehicle speed Nos and the position of the immediately-preceding throttle opening degree θacc and the immediately-preceding vehicle speed Nos. The step 220 decides whether or not the calculated connecting line crosses one of the boundaries (the upshift boundaries or the downshift boundaries). When the calculated connecting line crosses one of the boundaries, the step 220 decides that a related shift is required. Otherwise, the step 220 decides that any shift is not required. When it is decided that a shift is required, the program advances from the step 220 to a step 230. Otherwise, the program advances from the step 220 to a step 320.

The step 230 changes the positions of the gear-position controlling solenoid valves 115a and 115b in accordance with the type of the shift decided by the step 220. In the case of a shift to the first-speed gear position, the solenoid valves 115a and 115b are changed to the ON position and the OFF position respectively. In the case of a shift to the second-speed gear position, both the solenoid valves 115a and 115b are changed to the ON positions. In the case of a shift to the third-speed gear position, the solenoid valves 115a and 115b are changed to the OFF position and the ON position respectively. In the case of a shift to the fourth-speed gear position, both the solenoid valves 115a and 115b are changed to the OFF positions. Specifically, the ROM in the transmission controlling computer 114 stores information of a predetermined relation between the shift destination gear positions and the positions of the solenoid valves 115a and 115b. This information is used by the step 230 in changing the positions of the solenoid valves 115a and 115b.

A step 240 subsequent to the step 230 initializes a timer value t1 to "0". The timer value t1 is used for a process of quickly feeding hydraulic fluid to a passage leading to a frictional engagement device which is newly moved to an engaged position by the solenoid-valve control implemented by the step 230. After the step 240, the program advances to a step 250.

The step 250 outputs the drive signal to the line-pressure controlling solenoid valve 116 which has a preset duty cycle providing the highest hydraulic pressure (the highest line pressure PL). The function of the step 250 is to quickly charge a passage, which leads to a frictional engagement device newly moved to an engaged position, with hydraulic fluid.

A step 260 following the step 250 increments the timer value t1 by "1". After the step 260, the program advances to a step 270. The step 270 compares the timer value t1 with a predetermined value TF corresponding to a given time interval of the quickly charging process. When the timer value t1 is smaller than the predetermined value TF, the program returns from the step 270 to the step 250. When the timer value t1 is equal to or greater than the predetermined value TF, the program advances from the step 270 to a block 280. Accordingly, the highest line pressure PL continues to be supplied until the timer value t1 reaches the predetermined value TF.

In the case where the loop consisting of the steps 250, 260, and 270 is executed for every 16 msec, when the predetermined value TF is equal to "6", the highest line pressure PL for the quickly charging process continues to be supplied during a time interval of 96 msec (=16 msec multiplied by 6).

It should be noted that the highest line pressure PL for the quickly charging process may be replaced by any line pressure PL higher than a line pressure available in initial hydraulic pressure control. The given time interval of the quickly charging process may be different from 96 msec. It is preferable that the given time interval of the quickly charging process is in the range of 50 to 200 msec. Also, it is preferable to choose the given time interval of the quickly charging process in accordance with the line pressure PL set during the quickly charging process and the characteristics of mechanical parts related to the line pressure PL.

In general, the quickly charging process causes a rise in the hydraulic pressure in the related clutch. It is preferable to choose the line pressure PL and the given time interval of the quickly charging process so as to prevent the related clutch from falling into a torque phase due to the above-indicated rise in the hydraulic pressure. Furthermore, it is preferable to consider a response delay of the hydraulic pressure in the clutch relative to the line-pressure command in the choice of the line pressure PL and the given time interval of the quickly charging process.

The quickly charging process is effective to shorten a time interval to the start of movement of the related clutch into the torque phase. In addition, the quickly charging process is effective to prevent an unwanted shift during which the related clutch does not move out of an inertia phase until the end of a stroke of the piston 124 in the accumulator 120.

Figure 14:
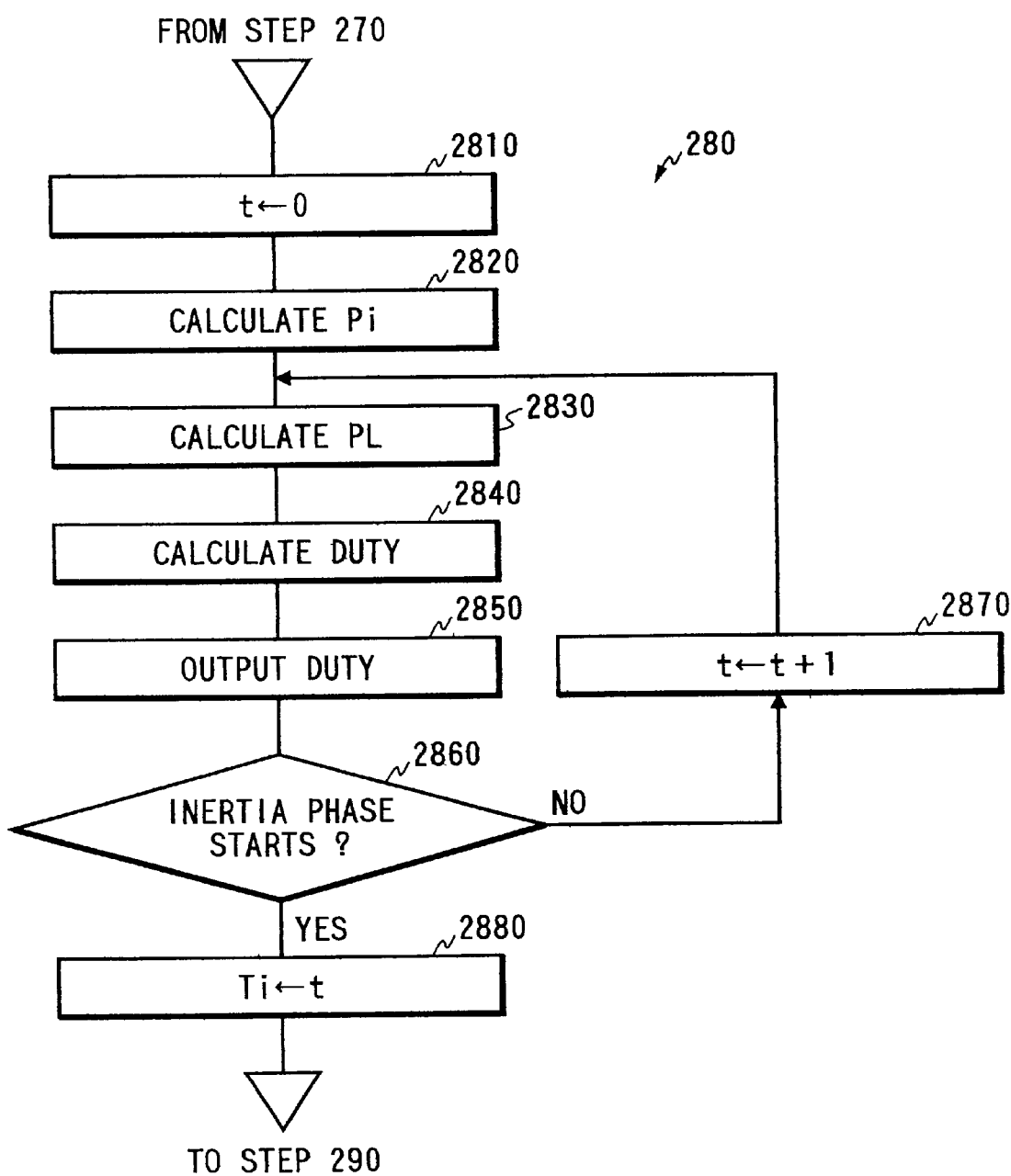
FIG. 14 is a flowchart of the details of a block in FIG. 12.

The block 280 is designed to implement a process of increasing the initial hydraulic pressure. As shown in FIG. 14, the block 280 includes steps 2810, 2820, 2830, 2840, 2850, 2860, 2870, and 2880. The step 2810 follows the step 270 of FIG. 12. The step 2810 initializes a timer value "t" to "0".

Figure 15:
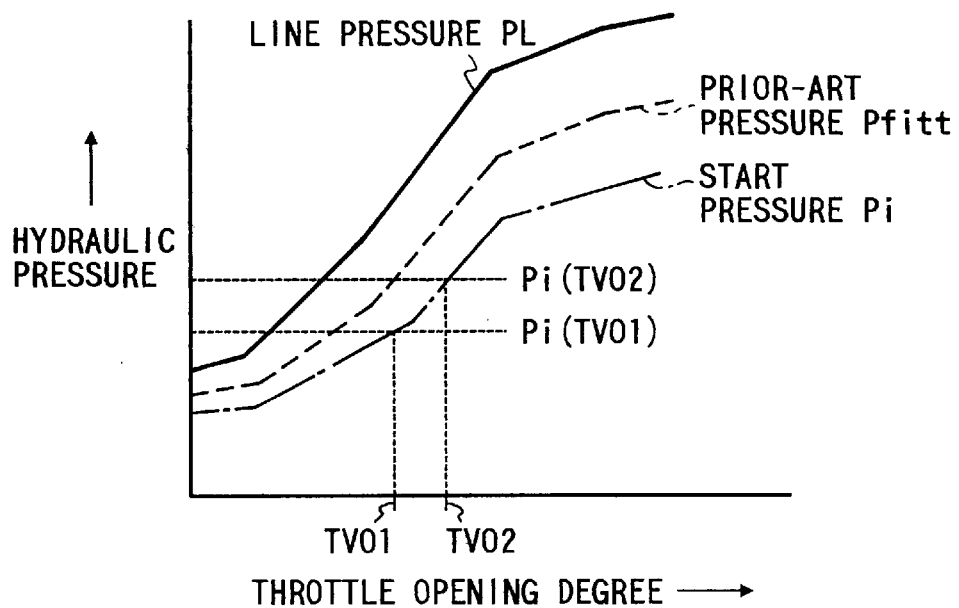
FIG. 15 is a diagram of a map providing the relation between a shift start hydraulic pressure Pi and a throttle opening degree, and the relation between a command line pressure PL of hydraulic fluid and the throttle opening degree in the second embodiment of this invention.

The step 2820 follows the step 2810. The step 2820 sets a shift start hydraulic pressure Pi in response to the current throttle opening degree θacc by referring to a map shown in FIG. 15. The ROM in the transmission controlling computer 114 stores information of the map in FIG. 15. The map in FIG. 15 defines the shift start hydraulic pressure Pi used upon a shift which is denoted by the dot-dash line. The map in FIG. 15 also defines a command line pressure PL of hydraulic fluid which is used during conditions other than a shift. The command line pressure PL of hydraulic fluid is denoted by the solid line. FIG. 15 indicates a corresponding prior-art hydraulic pressure Pfitt. The second embodiment of this invention features that the shift start hydraulic pressure Pi used upon a shift is lower than the corresponding prior-art hydraulic pressure Pfitt. After the step 2820, the program advances to the step 2830.

The step 2830 calculates a command line pressure (a desired line pressure) PL of hydraulic fluid from the timer value "t" and the shift start hydraulic pressure Pi by referring to the following equation.

$$PL = a \cdot t^2 + Pi + \Delta pi \quad (4)$$

where "a" denotes a constant predetermined in accordance with the mechanical characteristics of the automatic transmission 102, and "Δpi" denotes a corrective value decided as a result of a learning process explained later. Regarding the line-pressure controlling solenoid valve 116, the line pressure PL of hydraulic fluid increases in accordance with a decrease in the ratio of the rate of the escape flow of hydraulic fluid to the drain passage with respect to the rate of the effective flow of hydraulic fluid via the line-pressure regulator. The equation (4) is designed so that the ratio of the rate of the escape flow of hydraulic fluid to the drain passage with respect to the rate of the effective flow of hydraulic fluid via the line-pressure regulator drops in accordance with the lapse of time, and that the slope of the ratio drop increases in accordance with the lapse of time. It is preferable to choose the predetermined constant "a" so as to satisfy the relation that the value of "$a \cdot Tfitt^2 + Pi$" is slightly greater than the value of Pfitt. Here, "Pfitt" denotes the prior-art hydraulic pressure given by the map in FIG. 15, and "Tfitt" denotes a calculated time interval until the start of the inertia phase (the movement of the related clutch into the inertia phase). The corrective value Δpi is initialized to "0" when the vehicle is shipped out from a factory.

The step 2840 follows the step 2830. The step 2840 calculates a command duty cycle (a desired duty cycle) of the drive signal to the line-pressure controlling solenoid valve 116 from the command line pressure PL of hydraulic fluid by referring to a map shown in FIG. 16. The ROM in the transmission controlling computer 114 stores information of the map in FIG. 16.

The step 2850 follows the step 2840. The step 2850 outputs the drive signal to the line-pressure controlling solenoid valve 116 which has a duty cycle equal to the command duty cycle (the desired duty cycle).

The step 2860 follows the step 2850. The step 2860 decides whether or not the inertia phase has started, that is, whether or not the related clutch has moved into the inertia phase, by referring to the following relation.

$$Nos \cdot g - Nt \geq \Delta Nt \quad (5)$$

where "Nos" denotes the current vehicle speed; "g" denotes a gear speed ratio available prior to the present shift, that is, a factor of the gear position of the automatic transmission 102 which occurs prior to the present shift; "Nt" denotes the current input-shaft rotational speed; and "δNt" denotes a given constant equal to, for example, 50 rpm. When the relation (5) is not satisfied, that is, when the inertia phase has not yet started, the program advances from the step 2860 to the step 2870. When the relation (5) is satisfied, that is, when the inertia phase has started, the program advances from the step 2860 to the step 2880.

The step 2870 increments the timer value "t" by "1". After the step 2870, the program returns to the step 2830. The loop of the steps 2830, 2840, 2850, 2860, and 2870 is executed for every given time period (for example, 16 msec). Accordingly, the command line pressure PL of hydraulic fluid increases along a quadratic curve until the inertia phase starts. Here, the quadratic curve is determined by the equation (4).

The step 2880 sets an initial hydraulic-pressure control time interval Ti to the time value "t". The initial hydraulic-pressure control time interval Ti is used in a learning process explained later. After the step 2880, the program advances to a step 290 of FIG. 12.

With reference back to FIG. 12, the step 290 implements feedback control of the input-shaft rotational speed Nt in response to the line pressure PL of hydraulic fluid. During the feedback control, detection is made as to a moment at which the input-shaft rotational speed changes from an increasing state to a dropping state, and the line pressure PL of hydraulic pressure is adjusted so that the input-shaft rotational speed Nt drops at a given rate (a given slope) determined by designing conditions. The feedback control may be of a known type.

A step 300 following the step 290 decides whether or not the related shift (the related upshift) is completed. When the related shift is completed, the program advances from the step 300 to a block 310. Otherwise, the program returns from the step 300 to the step 290. Therefore, the feedback control of the input-shaft rotational speed Nt continues to be implemented until the related shift is completed. In this case, the step 290 is executed for every given time period (for example, 16 msec).

The decision by the step 300 is based on detection of a moment at which the direction of a variation in the input-shaft rotational speed Nt is inverted, for example, detection of a moment at which the input-shaft rotational speed Nt restarts to increase from a dropping state in accordance with the progress of the related shift. It may be decided that the related shift is completed when the following relation is satisfied.

$$Nos\cdot(1/h)-Nt<\Delta No$$

where "Nos" denotes the current vehicle speed; "h" denotes a gear speed ratio available in the shift destination gear position; "Nt" denotes the current input-shaft rotational speed; and "$\Delta No$" denotes a given constant equal to, for example, 50 rpm.

Figure 17:
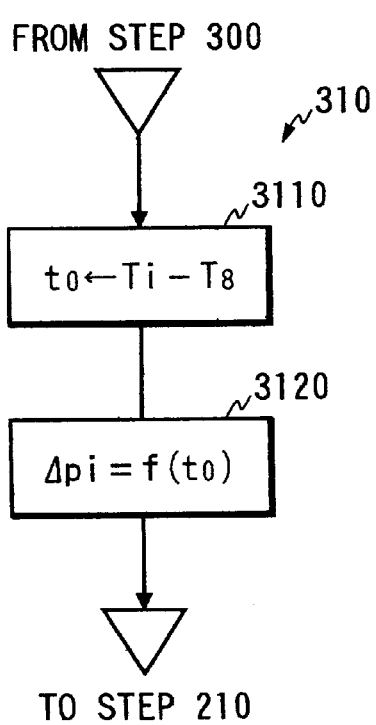
FIG. 17 is a flowchart of the details of another block in FIG. 12.
Figure 18:
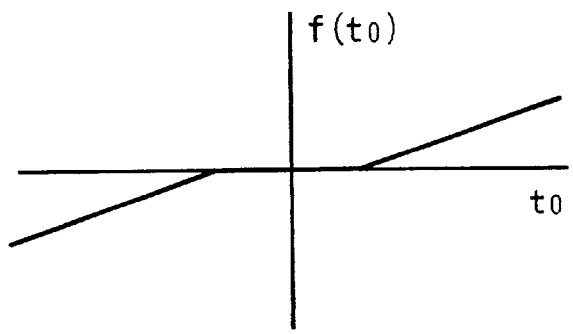
FIG. 18 is a diagram of a map providing the relation between a corrective value Δpi and a time difference "to" in the second embodiment of this invention.
Figure 19:
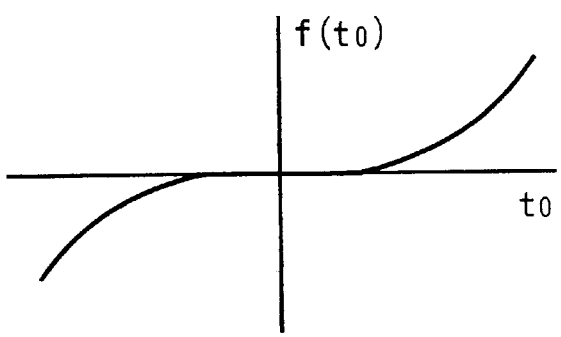
FIG. 19 is a diagram of a map providing the relation between a corrective value Δpi and a time difference "to" in the second embodiment of this invention.

The block 310 is designed to implement a process of learning a parameter of initial hydraulic-pressure increasing control. As shown in FIG. 17, the block 310 includes steps 3110 and 3120. The step 3110 follows the step 300 of FIG. 12. The step 3110 calculates a time difference "to" by subtracting a predetermined reference time interval TB from the initial hydraulic-pressure control time 20 interval Ti. The step 3120 follows the step 3110. The step 3120 calculates the corrective value $\Delta pi$ from the time difference "to" by referring to a map shown in FIG. 18 or a map shown in FIG. 19. As previously explained, the corrective value $\Delta pi$ is used for the calculation of the command line pressure PL of hydraulic fluid during a starting stage. The ROM in the transmission controlling computer 114 stores information of the map in FIG. 18 or the map in FIG. 19. Each of the map in FIG. 18 and the map in FIG. 19 has a dead zone in which the corrective value $\Delta pi$ is equal to "0" when the time difference "to" resides in a given range around "0". The dead zone prevents the outcome of the learning process from being unstable due to wrong setting of the initial hydraulic-pressure control time interval Ti or a temporary change in shift conditions. It is preferable to determine the reference time interval TB in accordance with a desired time interval during which the initial hydraulic-pressure increasing control is successfully completed since the line pressure PL of hydraulic fluid is suitably adjusted and hence the related shift progresses normally. The reference time interval TB corresponds to the time interval Tfitt used for the setting of the constant "a" in connection with the equation (4). After the step 3120, the program returns to the step 210 of FIG. 12.

With reference back to FIG. 12, the step 320 calculates the command line pressure PL of hydraulic fluid from the current throttle opening degree $\theta$acc by referring to the map in FIG. 15.

Figure 16:
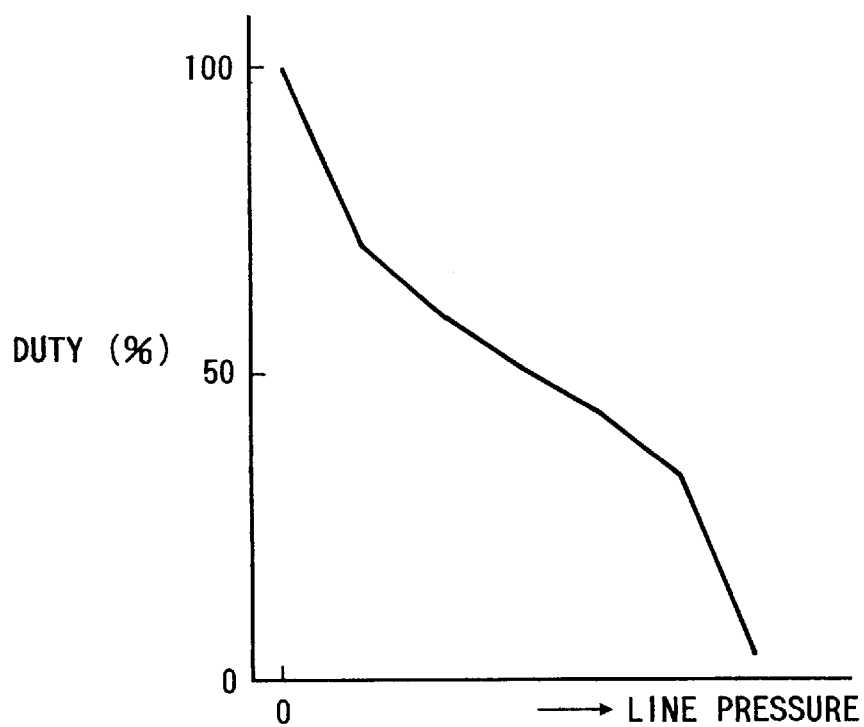
FIG. 16 is a diagram of a map providing the relation between a command duty cycle and a command line pressure of hydraulic fluid in the second embodiment of this invention.

A step 330 following the step 320 calculates a command duty cycle (a desired duty cycle) of the drive signal to the line-pressure controlling solenoid valve 116 from the command line pressure PL of hydraulic fluid by referring to the map in FIG. 16.

A step 340 subsequent to the step 330 outputs the drive signal to the line-pressure controlling solenoid valve 116 which has a duty cycle equal to the command duty cycle (the desired duty cycle). After the step 340, the program returns to the step 210.

Figure 20:
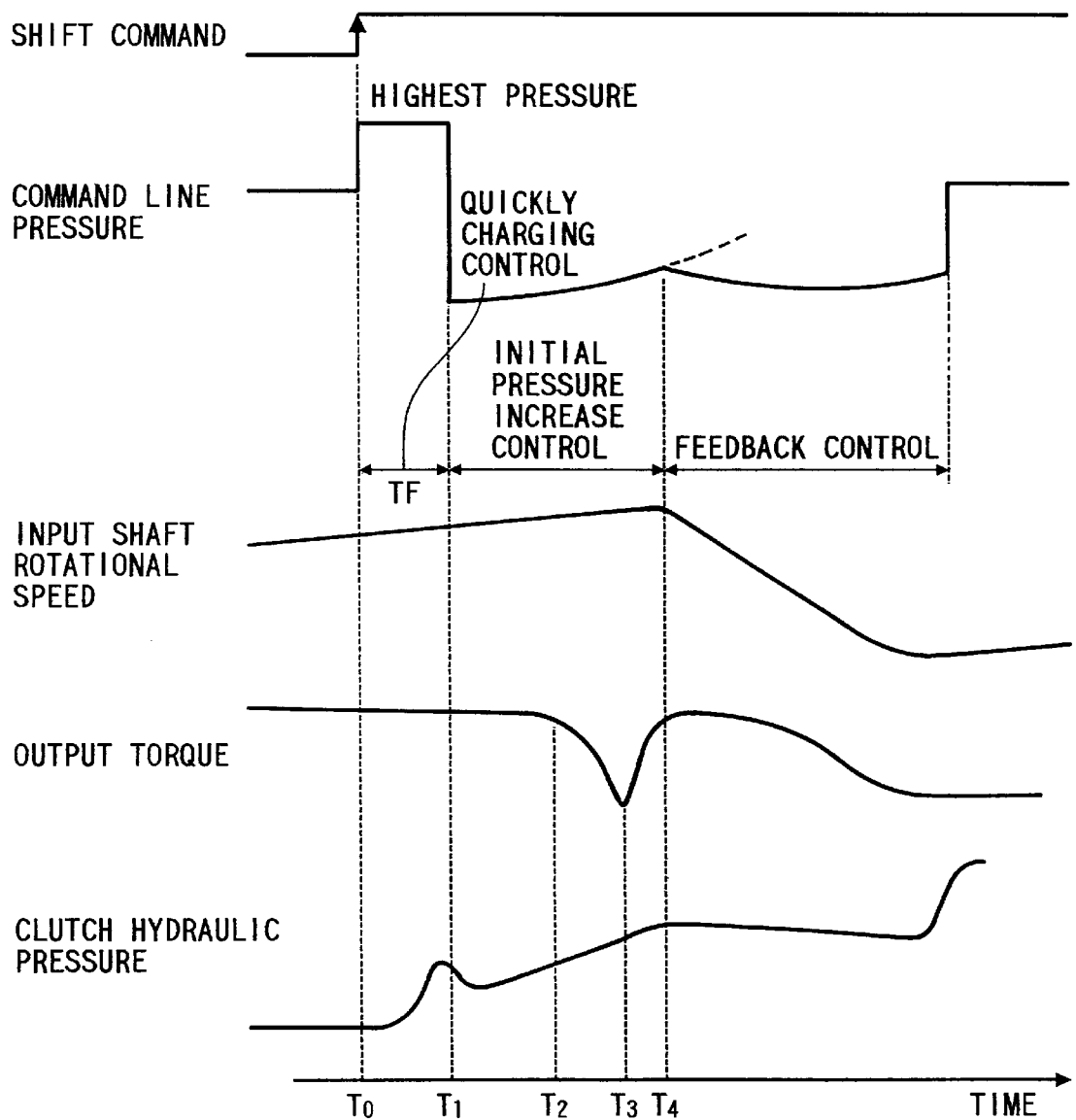
FIG. 20 is a time-domain diagram of a required gear position of an automatic transmission, a command line pressure of hydraulic fluid, an input-shaft rotational speed, a torque on an output shaft, and a hydraulic pressure in a clutch in the second embodiment of this invention.

With reference to FIG. 20, a requirement for an upshift occurs at a moment T0. The upshift requirement is detected by the step 220 in FIG. 12 so that the positions of the gear-position controlling solenoid valves 115a and 115b are changed by the step 230 in accordance with the type of the upshift. During the time interval TF from the moment T0 to a subsequent moment T1, the loop of the steps 250, 260, and 270 in FIG. 12 is iteratively executed so that the highest command line pressure PL is available. The time interval TF corresponds to a quickly-charging time interval for which a passage to a related clutch is quickly charged with hydraulic fluid. The hydraulic pressure in the related clutch rises at a great rate due to the quickly charging process.

At the moment T1, the command line pressure PL of hydraulic fluid is reduced to the shift start hydraulic pressure Pi by the block 280 in FIG. 12. During the time interval from the moment T1 to a subsequent moment T4, the command line pressure PL of hydraulic fluid increases from the shift start hydraulic pressure Pi along a quadratic curve according to the initial hydraulic-pressure increasing control implemented by the block 280 in FIG. 12. During the time interval between the moments T1 and T4, the hydraulic pressure in the related clutch drops and then rises along a quadratic curve due to operation of the accumulator 120. At a moment T2 between the moments T1 and T4, the related clutch enters the toque phase so that the torque on the output shaft 113 starts to drop. At a moment T3 following the moment T2 but preceding the moment T4, the related clutch moves from the torque phase to the inertia phase so that the torque on the output shaft 113 reaches a minimal value and starts to rise. At the moment T4, the input-shaft rotational speed Nt starts to fall, and the feedback control of the input-shaft rotational speed Nt is commenced. This feedback control is implemented by the step 290 in FIG. 12.

As previously explained, during the time interval after the quickly charging process but before the feedback control, the hydraulic pressure in the related clutch rises along a quadratic curve. A differential coefficient (a slope) of the quadratic curve at a given moment, that is, the rate of the rise in the hydraulic pressure in the related clutch at a given moment, increases as the line pressure PL of hydraulic fluid rises. Therefore, the time interval between the start and the end of the torque phase is substantially independent of the line pressure PL of hydraulic fluid.

Figure 21:
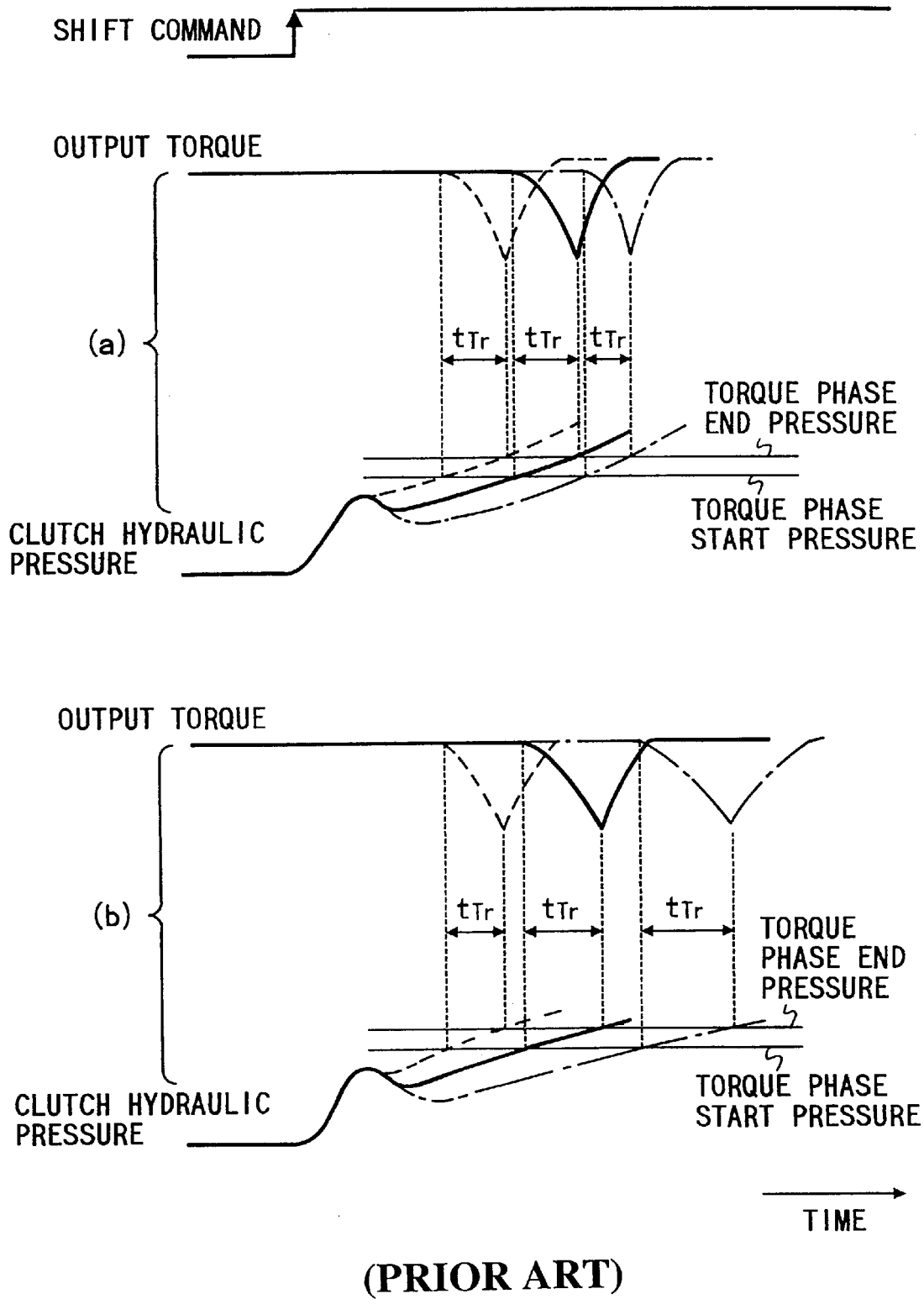
FIG. 21 is a time-domain diagram of a required gear position of an automatic transmission, a torque on an output shaft, and a hydraulic pressure in a clutch in the second embodiment of this invention, and also a torque on an output shaft and a hydraulic pressure in a clutch in a comparative design.

With reference to the portion (a) of FIG. 21, in the case where the line pressure PL of hydraulic fluid is relatively high, the torque on the output shaft 113 and the hydraulic pressure in the related clutch vary along the dash curves. In the case where the line pressure PL of hydraulic fluids relatively low, the torque on the output shaft 113 and the hydraulic pressure in the related clutch vary along the dot-dash curves. In the case where the line pressure PL of hydraulic fluid is normal, the torque on the output shaft 113 and the hydraulic pressure in the related clutch vary along the solid curves. As shown in the portion (a) of FIG. 21, the time interval tTr during which the hydraulic pressure in the related clutch rises from the torque phase start level to the torque phase end level is substantially independent of the line pressure PL of hydraulic fluid.

A comparative design is now assumed which lacks the positive control of the line pressure PL of hydraulic fluid. The portion (b) of FIG. 21 shows time-domain variations in the torque on an output shaft and the hydraulic pressure in a clutch which are available in the comparative design. With reference to the portion (b) of FIG. 21, in the case where the line pressure PL of hydraulic fluid is relatively high, the torque on the output shaft and the hydraulic pressure in the clutch vary along the dash curves. In this case, the hydraulic pressure in the clutch rises from the torque phase start level to the torque phase end level along a line having a great slope. In the case where the line pressure PL of hydraulic fluid is relatively low, the torque on the output shaft and the hydraulic pressure in the clutch vary along the dot-dash curves. In this case, the hydraulic pressure in the clutch rises from the torque phase start level to the torque phase end level along a line having a small slope. In the case where the line pressure PL of hydraulic fluid is normal, the torque on the output shaft and the hydraulic pressure in the clutch vary along the solid curves. In this case, the hydraulic pressure in the clutch rises from the torque phase start level to the torque phase end level along a line having an intermediate slope. As shown in the portion (b) of FIG. 21, the time interval during which the hydraulic pressure in the clutch rises from the torque phase start level to the torque phase end level sensitively depends on the line pressure PL of hydraulic fluid.

As previously explained, according to the second embodiment of this invention, the time interval tTr during which the hydraulic pressure in the related clutch rises from the torque phase start level to the torque phase end level is substantially independent of the line pressure PL of hydraulic fluid. Therefore, a variation in the torque on the output shaft 113 is substantially independent of the line pressure PL of hydraulic fluid.

The learning process implemented by the block 310 in FIG. 12 provides the corrective value Δpi for the command line pressure PL of hydraulic fluid during a starting stage. After the learning process, the step 2830 in FIG. 14 corrects or updates the shift start hydraulic pressure Pi into the value of Pi+Δpi. The correction of the shift start hydraulic pressure Pi enables the torque phase to be started at a moment more suited to the characteristics of the automatic transmission 102.

It is understood from the portion (a) of FIG. 21 that the moment of the start of the torque phase and also the moment of the end of the torque phase are delayed as the line pressure PL of hydraulic fluid drops. The corrective value Δpi is proportional to the initial hydraulic-pressure control time interval Ti minus the predetermined reference time interval TB. The increase of the shift start hydraulic pressure Pi by the corrective value Δpi enables the time interval until the moment of the start of the inertia phase to be close to the predetermined reference time interval TB.

The corrective value Δpi may be updated or corrected according to the following program statement.

$$\Delta pi = \Delta pi(TVO1) \cdot Pi(TVO2)/Pi(TVO1) \qquad (6)$$

where "Δpi(TVO1)" denotes the corrective value corresponding to the throttle opening degree θacc (TVO1) available during the immediately previous execution cycle of the program segment; "Pi(TVO2)" denotes the shift start hydraulic pressure Pi determined in response to the throttle opening degree θacc (TVO2) available during the current execution cycle of the program segment; and "Pi(TVO1)" denotes the shift start hydraulic pressure Pi determined in response to the throttle opening degree θacc (TVO1) available during the immediately previous execution cycle of the program segment. FIG. 15 shows examples of the previous throttle opening degree TVO1, the current throttle opening degree TVO2, the previous shift start hydraulic pressure Pi(TVO1), and the current shift start hydraulic pressure Pi(TVO2). In this case, the learning process reflects the characteristic of the shift start hydraulic pressure Pi with respect to the throttle opening degree θacc.

Figure 22:
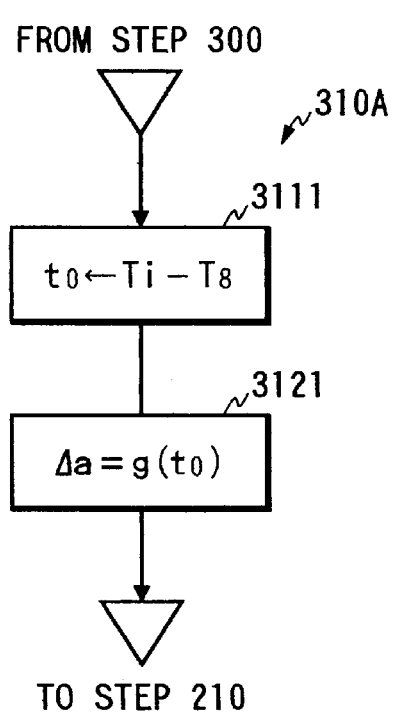
FIG. 22 is a flowchart of a portion of a program in a modified version of the second embodiment of this invention.
Figure 23:
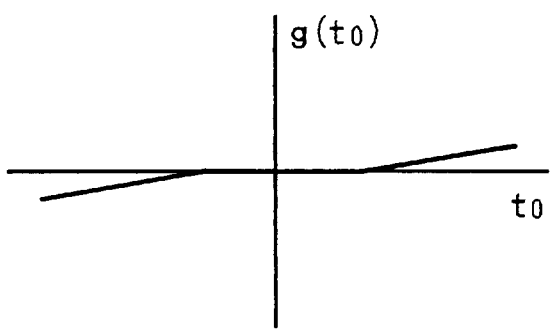
FIG. 23 is a diagram of a map providing the relation between a corrective value Δpi and a time difference "to" in the modified version of the second embodiment of this invention.
Figure 24:
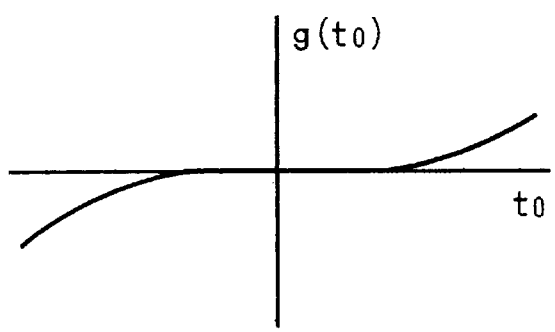
FIG. 24 is a diagram of a map providing the relation between a corrective value Δpi and a time difference "to" in the modified version of the second embodiment of this invention.

The second embodiment of this invention may be modified into a version explained hereinafter. The modified version of the second embodiment uses a block 310A instead of the block 310 in FIGS. 12 and 17. The block 310A is designed to implement a learning process. As shown in FIG. 22, the block 310A includes steps 3111 and 3121. The step 3111 follows the step 300 of FIG. 12. The step 3111 calculates a time difference "to" by subtracting a predetermined reference time interval TB from the initial hydraulic-pressure control time interval Ti. The step 3121 follows the step 3111. The step 3121 calculates a corrective value Δa from the time difference "to" by referring to a map shown in FIG. 23 or a map shown in FIG. 24. The corrective value Δa is used for the calculation of a command line pressure PL of hydraulic fluid during a starting stage. The ROM in the transmission controlling computer 114 stores information of the map in FIG. 23 or the map in FIG. 24. Each of the map in FIG. 23 and the map in FIG. 24 has a dead zone in which the corrective value Δa is equal to "0" when the time difference "to" resides in a given range around "0". The dead zone prevents the outcome of the learning process from being unstable due to wrong setting of the initial hydraulic-pressure control time interval Ti or a temporary change in shift conditions. After the step 3121, the program returns to the step 210 of FIG. 12.

In the modified version of the second embodiment, a step 2830 (see FIG. 14) calculates a command line pressure or a desired line pressure PL of hydraulic fluid from the timer value "t" and the shift start hydraulic pressure Pi by referring to the following equation.

$$PL = (a + \Delta a) \cdot t^2 + Pi \qquad (7)$$

Therefore, the coefficient of the quadratic term in the equation (7) is updated or corrected in response to the corrective value Δa on the basis of the learning process. The modified version of the second embodiment may additionally implement correction responsive to the throttle opening degree θacc which is similar to the previously-mentioned correction.

As understood from the previous description, the second embodiment of this invention suitably controls the line pressure PL of hydraulic pressure at a start of a gear shift of the automatic transmission 102. According to the second embodiment of this invention, the feedback control of the input-shaft rotational speed Nt adequately suppresses a shock upon a gear shift of the automatic transmission 102 even if characteristic variations or condition changes are present. In addition, it is possible to compensate for a deviation of the line pressure PL of hydraulic fluid from the desired level which is caused by factors such as characteristic variations and ageing. Thus, it is possible to start the torque phase at a suitable timing. Furthermore, the time interval (the duration) of the torque phase can be suitably controlled.

Third Embodiment

A third embodiment of this invention is similar to the second embodiment thereof except for design changes indicated later.

Figure 25:
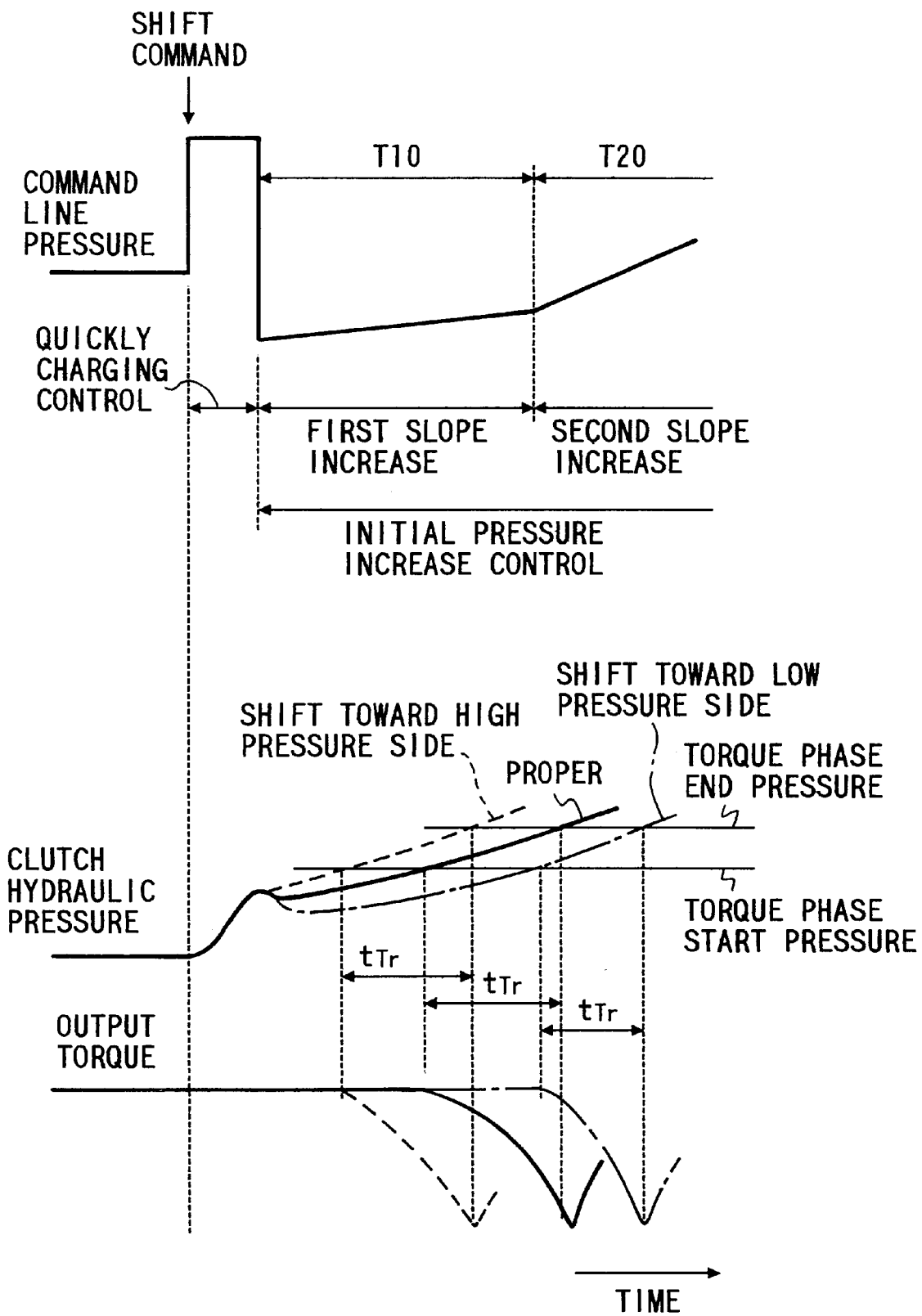
FIG. 25 is a time-domain diagram of a command line pressure of hydraulic fluid, a hydraulic pressure in a clutch, and a torque on an output shaft in a third embodiment of this invention.

With reference to FIG. 25, during a time interval from the moment of the occurrence of a requirement for an upshift, the highest command line pressure PL of hydraulic fluid is continuously provided to implement a process of quickly charging a passage to a related clutch with hydraulic fluid. The quickly-charging time interval is followed by a time interval of initial hydraulic-pressure increasing control. At the end of the quickly-charging time interval, the command line pressure PL of hydraulic fluid is reduced to the shift start hydraulic pressure Pi. During a former part T10 of the time interval of the initial hydraulic-pressure increasing control, the command line pressure PL of hydraulic fluid increases from the shift start hydraulic pressure Pi at a first constant rate (a small constant slope). During this time interval T10, the hydraulic pressure in the related clutch gradually rises due to operation of the accumulator 120. During a latter part T20 of the time interval of the initial hydraulic-pressure increasing control, the command line pressure PL of hydraulic fluid increases at a second constant rate (a great constant slope) larger than the first constant rate. In this way, the rate or the slope of the increase in the command line pressure PL of hydraulic fluid changes at a moment between the former part T10 and the latter part T20 of the time interval of the initial hydraulic-pressure increasing control. It is preferable that the timing of the change of the rate (the slope) of the increase in the line pressure PL immediately precedes the moment of the end of the torque phase which occurs when the hydraulic pressure in the related clutch is proper as denoted by the solid line in FIG. 25. This design enables a quick increase in the hydraulic pressure in the related clutch when the hydraulic pressure shifts toward a lower side.

In the case where the hydraulic pressure in the related clutch shifts toward a higher side as a result of a higher line pressure of hydraulic fluid, the hydraulic pressure is controlled along the dash curve in FIG. 25. In the case where the hydraulic pressure in the related clutch shifts toward a lower side as a result of a lower line pressure of hydraulic fluid, the hydraulic pressure is controlled along the dot-dash curve in FIG. 25. The time interval tTr during which the hydraulic pressure in the related clutch rises from the torque phase start level to the torque phase end level is substantially independent of whether the hydraulic pressure shifts toward a higher side or a lower side.

Figure 26:
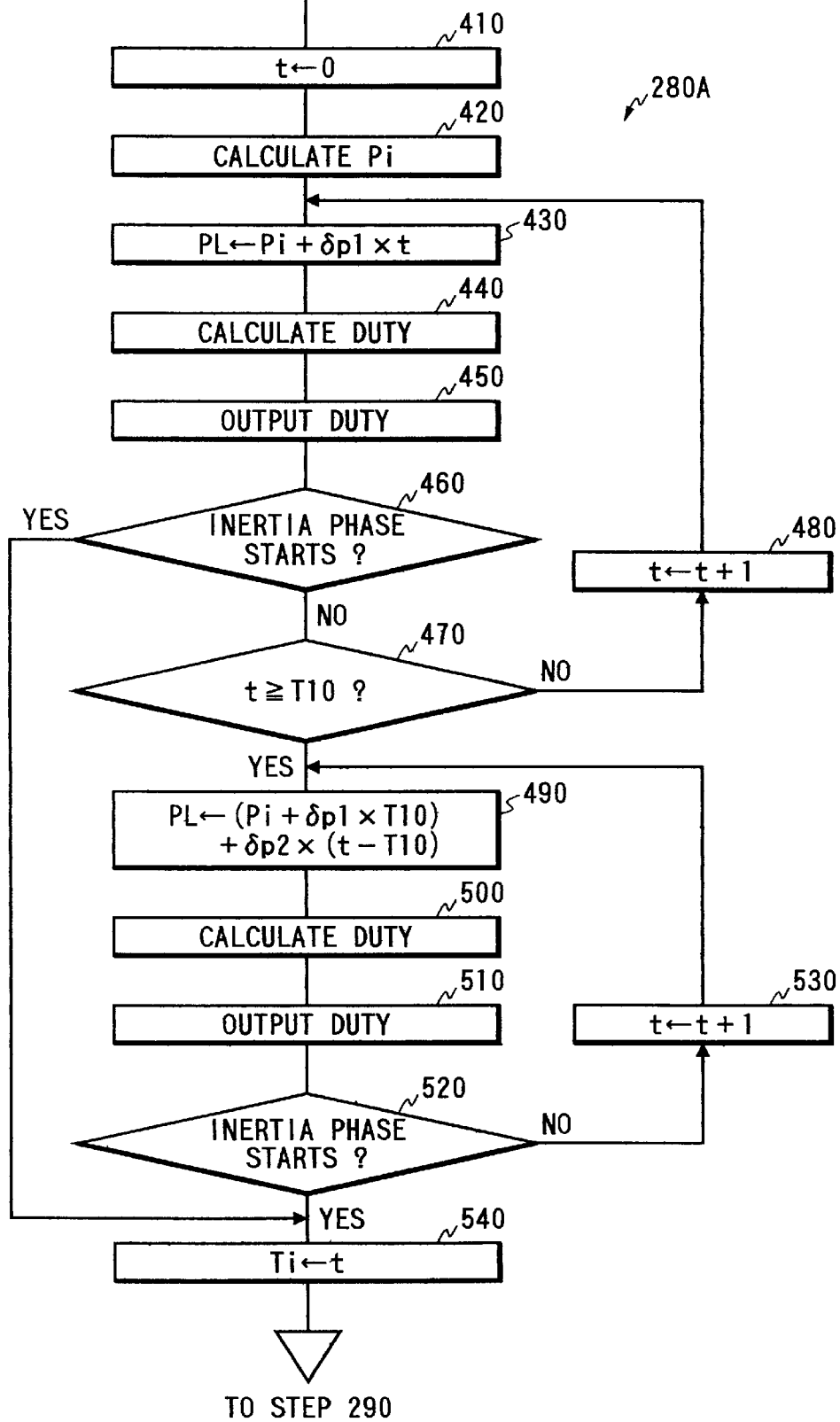
FIG. 26 is a flowchart of a segment of a program in the third embodiment of this invention.

The third embodiment includes a block 280A instead of the block 280 in FIGS. 12 and 14. FIG. 26 shows the details of the block 280A. As shown in FIG. 26, a first step 410 in the block 280A follows the step 270. The step 410 initializes a timer value "t" to "0". A step 420 following the step 410 sets a shift start hydraulic pressure Pi in response to the current throttle opening degree θacc by referring to the map shown in FIG. 15. After the step 420, the program advances to a step 430.

The step 430 calculates a command line pressure or a desired line pressure PL of hydraulic fluid from the timer value "t" and the shift start hydraulic pressure Pi by referring to the following equation.

$$PL = Pi + \delta p1 \cdot t \quad (8)$$

where "δp1" denotes the previously-indicated first pressure-increasing slope. A step 440 subsequent to the step 430 calculates a command duty cycle (a desired duty cycle) of the drive signal to the line-pressure controlling solenoid valve 116 from the command line pressure PL of hydraulic fluid by referring to the map in FIG. 16. A step 450 following the step 440 outputs the drive signal to the line-pressure controlling solenoid valve 116 which has a duty cycle equal to the command duty cycle (the desired duty cycle).

A step 460 subsequent to the step 450 decides whether or not the inertia phase has started, that is, whether or not the related clutch has moved into the inertia phase, by referring to the previously-indicated relation (5). When the inertia phase has not yet started, the program advances from the step 460 to a step 470.

When the inertia phase has started, the program advances from the step 460 to a step 540.

The step 470 compares the timer value "t" with a first predetermined time interval T10. When the timer value "t" is smaller than the first predetermined time interval T10, the program advances from the step 470 to a step 480. Otherwise, the program advances from the step 470 to a step 490. The step 480 increments the timer value "t" by "1". After the step 480, the program returns to the step 430. The loop of the steps 430, 440, 450, 460, 470, and 480 is executed for every given time period (for example, 16 msec). Accordingly, the command line pressure PL of hydraulic fluid continues to increase at the first constant rate (the first pressure-increasing slope) during the first predetermined time interval T10.

The step 490 calculates a command line pressure or a desired line pressure PL of hydraulic fluid from the timer value "t", the shift start hydraulic pressure Pi, the first predetermined time interval T10, and the first predetermined rate (the first pressure-increasing slope) δp1 by referring to the following equation.

$$PL = (Pi + \delta p1 \cdot t) + \delta p2 \cdot (t - T10) \quad (9)$$

where "δp2" denotes the previously-indicated second pressure-increasing slope. The second pressure-increasing slope δp2 is greater than the first pressure-increasing slope δp1. A step 500 subsequent to the step 490 calculates a command duty cycle (a desired duty cycle) of the drive signal to the line-pressure controlling solenoid valve 116 from the command line pressure PL of hydraulic fluid by referring to the map in FIG. 16. A step 510 following the step 500 outputs the drive signal to the line-pressure controlling solenoid valve 116 which has a duty cycle equal to the command duty cycle (the desired duty cycle).

A step 520 subsequent to the step 510 decides whether or not the inertia phase has started, that is, whether or not the related clutch has moved into the inertia phase, by referring to the previously-indicated relation (5). When the inertia phase has not yet started, the program advances from the step 520 to a step 530. When the inertia phase has started, the program advances from the step 520 to the step 540.

The step 530 increments the timer value "t" by "1". After the step 530, the program returns to the step 490. The loop of the steps 490, 500, 510, 520, and 530 is executed for every given time period (for example, 16 msec). Accordingly, the command line pressure PL of hydraulic fluid continues to increase at the second constant rate (the second pressure-increasing slope) until the inertia phase starts.

The step 540 sets an initial hydraulic-pressure control time interval Ti to the time value "t". The initial hydraulic-pressure control time interval Ti is used in a learning process as in the second embodiment of this invention. After the step 540, the program advances to the step 290 of FIG. 12.

The learning process is designed so that the shift start hydraulic pressure Pi, the first pressure-increasing slope δp1, or the second pressure-increasing slope δp2 increases in accordance with an increase in the time difference "to" between the initial hydraulic-pressure control time interval Ti and the predetermined reference time interval TB. Alternatively, the learning process may be designed so that the first predetermined time interval T10 shortens as the time difference "to" between the initial hydraulic-pressure control time interval Ti and the predetermined reference time interval TB increases.

Fourth Embodiment

A fourth embodiment of this invention corresponds to a combination of the second and third embodiments thereof.

Figure 27:
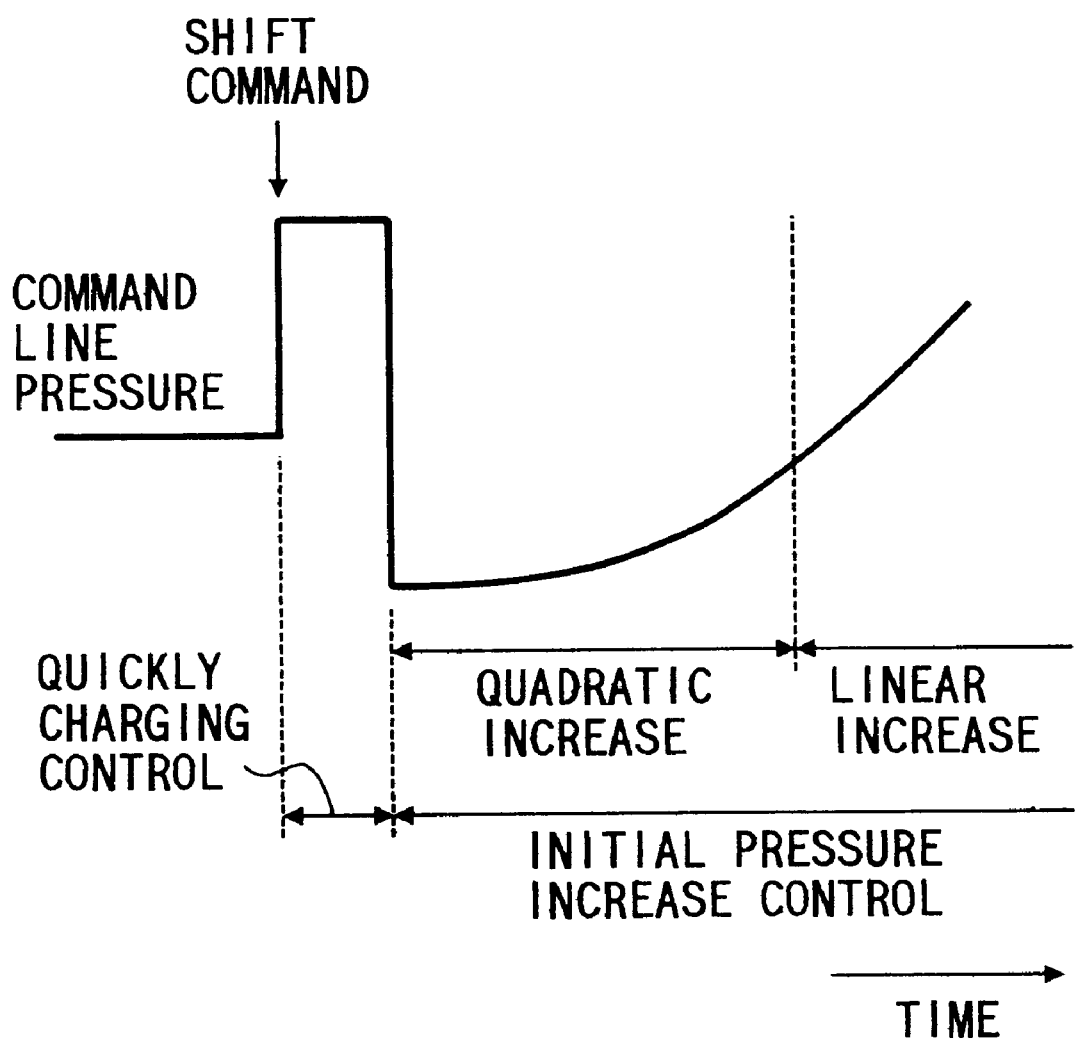
FIG. 27 is a time-domain diagram of a command line pressure of hydraulic fluid in a fourth embodiment of this invention.

With reference to FIG. 27, during a former stage of initial hydraulic-pressure increasing control, a command line pressure (a desired line pressure) PL of hydraulic fluid increases along a quadratic curve. During a latter stage of the initial hydraulic-pressure increasing control, the command line pressure PL linearly increases.

The fourth embodiment of this invention provides advantages similar to those of the second and third embodiments thereof.

First Experiment

Figure 28:
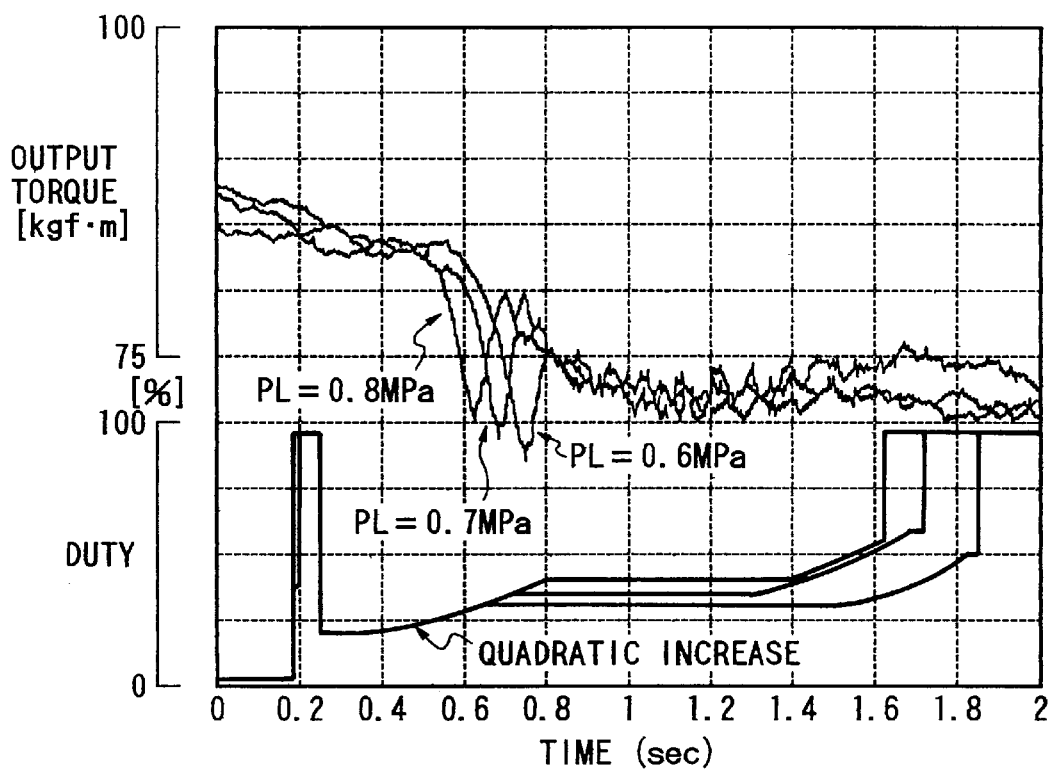
FIG. 28 is a time-domain diagram of measured values of a torque on an output shaft and a duty cycle which were available during experiments on an arrangement based on the first embodiment of this invention.

Experiments were performed on an arrangement based on the first embodiment of this invention. During the experiments, a requirement for an upshift from the first-speed gear position and the second-speed gear position was issued at least three times, and the throttle opening degree TVO was held equal to 28%. During the experiments, the torque on the output shaft 9 was measured while the line pressure PL of hydraulic fluid was held equal to 0.8 MPa and the duty cycle of the drive signal to the electromagnetic valve 57 was increased along a quadratic curve after the quickly charging process. Also, the torque on the output shaft 9 was measured while the line pressure PL of hydraulic fluid was held equal to 0.7 MPa and the duty cycle of the drive signal to the electromagnetic valve 57 was increased along a quadratic curve after the quickly charging process. Furthermore, the torque on the output shaft 9 was measured while the line pressure PL of hydraulic fluid was held equal to 0.6 MPa and the duty cycle of the drive signal to the electromagnetic valve 57 was increased along a quadratic curve after the quickly charging process. FIG. 28 shows the results of the measurements. According to the results of the measurements, it was confirmed that the time interval tTr of the toque phase was substantially independent of the line pressure PL of hydraulic fluid. Also, it was confirmed that the variation ΔT in the torque on the output shaft 9 was substantially independent of the line pressure PL of hydraulic fluid.

Figure 29:
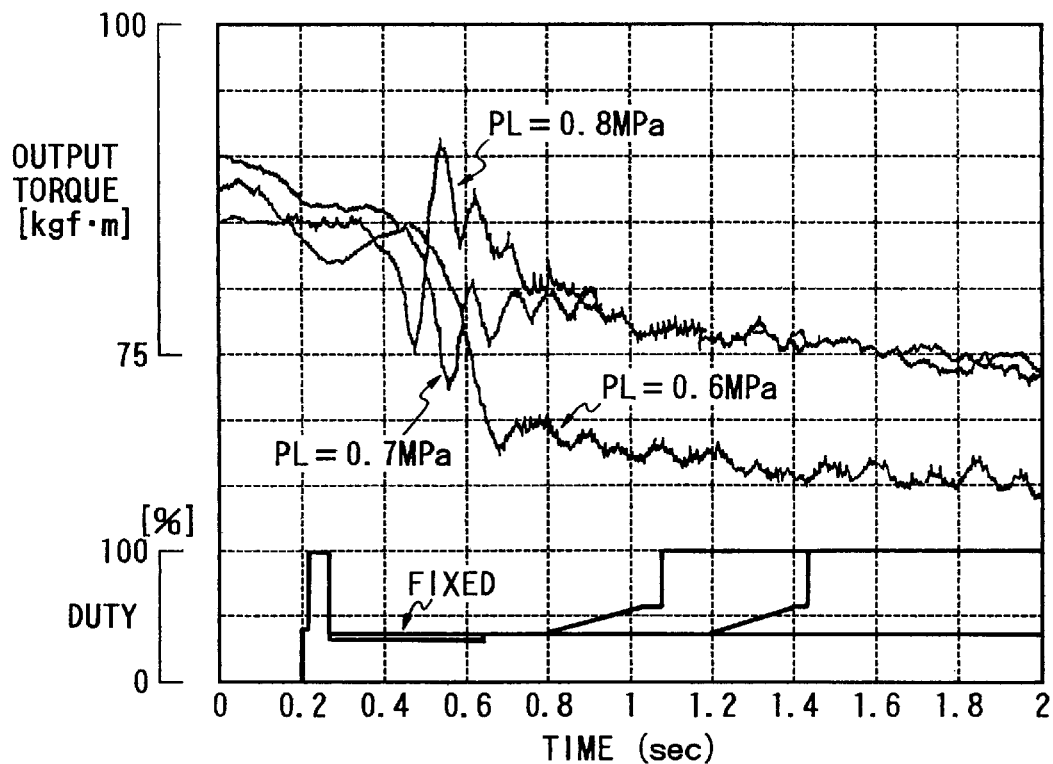
FIG. 29 is a time-domain diagram of measured values of a torque on an output shaft and a duty cycle which were available during comparative experiments.

Comparative experiments were performed. During the comparative experiments, a requirement for an upshift from the first-speed gear position and the second-speed gear position was issued at least three times, and the throttle opening degree TVO was held equal to 28%. During the comparative experiments, the torque on the output shaft 9 was measured while the line pressure PL of hydraulic fluid was held equal to 0.8 MPa and the duty cycle of the drive signal to the electromagnetic valve 57 was held at a fixed value after the quickly charging process. Also, the torque on the output shaft 9 was measured while the line pressure PL of hydraulic fluid was held equal to 0.7 MPa and the duty cycle of the drive signal to the electromagnetic valve 57 was held at the fixed value after the quickly charging process. Furthermore, the torque on the output shaft 9 was measured while the line pressure PL of hydraulic fluid was held equal to 0.6 MPa and the duty cycle of the drive signal to the electromagnetic valve 57 was held at the fixed value after the quickly charging process. FIG. 29 shows the results of the measurements. When the line pressure PL of hydraulic fluid was equal to 0.6 MPa, an upshift was not carried out. In the case where the line pressure PL of hydraulic fluid was equal to 0.8 MPa, a great torque variation occurred upon a change from the torque phase to an inertia phase. In addition, the torque phase was abruptly replaced by the inertia phase.

Second Experiment

Figure 30:
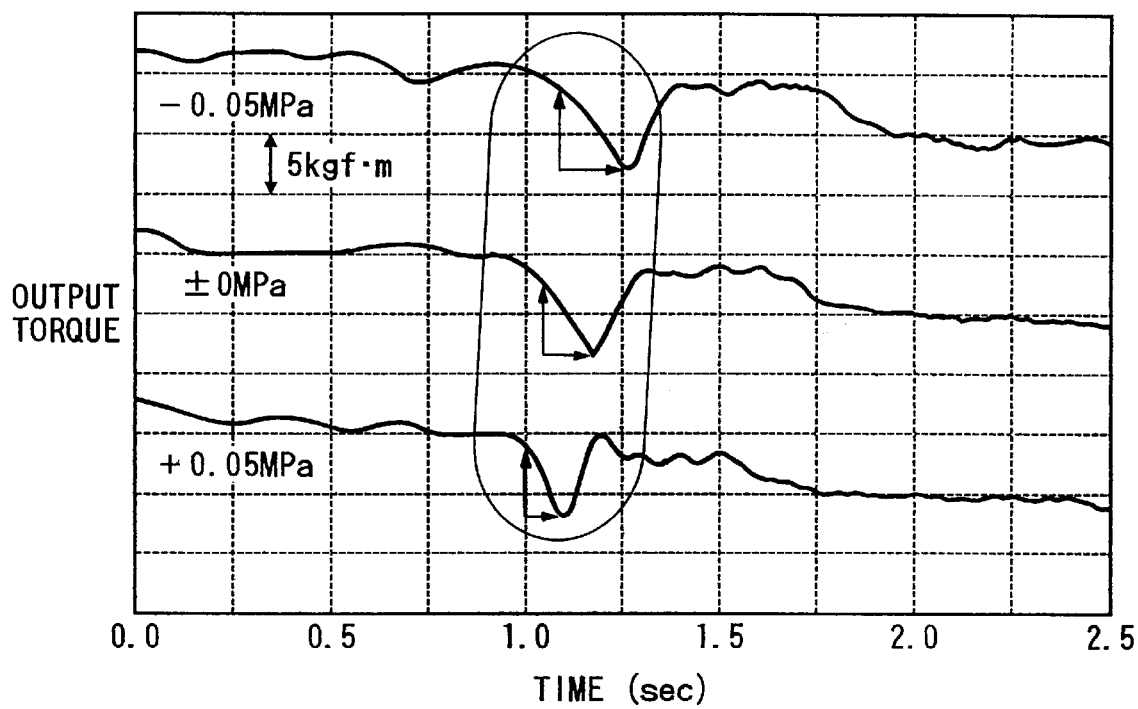
FIG. 30 is a time-domain diagram of measured values of a torque on an output shaft which were available during experiments on an arrangement based on the second embodiment of this invention.

Experiments were performed on an arrangement based on the second embodiment of this invention. During the experiments, a requirement for an upshift from the first-speed gear position and the second-speed gear position was issued at least three times, and the throttle opening degree IVO was held equal to 2/8. During the experiments, the torque on the output shaft 113 was measured while the initial value of the line pressure PL of hydraulic fluid was equal to a normal value and the duty cycle of the drive signal to the line-pressure controlling solenoid valve 116 was increased along a quadratic curve after the quickly charging process. Also, the torque on the output shaft 113 was measured while the initial value of the line pressure PL of hydraulic fluid was higher than the normal value by 0.05 MPa and the duty cycle of the drive signal to the line-pressure controlling solenoid valve 116 was increased along a quadratic curve after the quickly charging process. Furthermore, the torque on the output shaft 113 was measured while the initial value of the line pressure PL of hydraulic fluid was lower than the normal value by 0.05 MPa and the duty cycle of the drive signal to the line-pressure controlling solenoid valve 116 was increased along a quadratic curve after the quickly charging process. FIG. 30 shows the results of the measurements. According to the results of the measurements, it was confirmed that the time interval tTr of the toque phase was substantially independent of the line pressure PL of hydraulic fluid. Also, it was confirmed that the variation ΔT in the torque on the output shaft 113 during the change from the torque phase to the inertia phase was substantially independent of the line pressure PL of hydraulic fluid.

Figure 31:
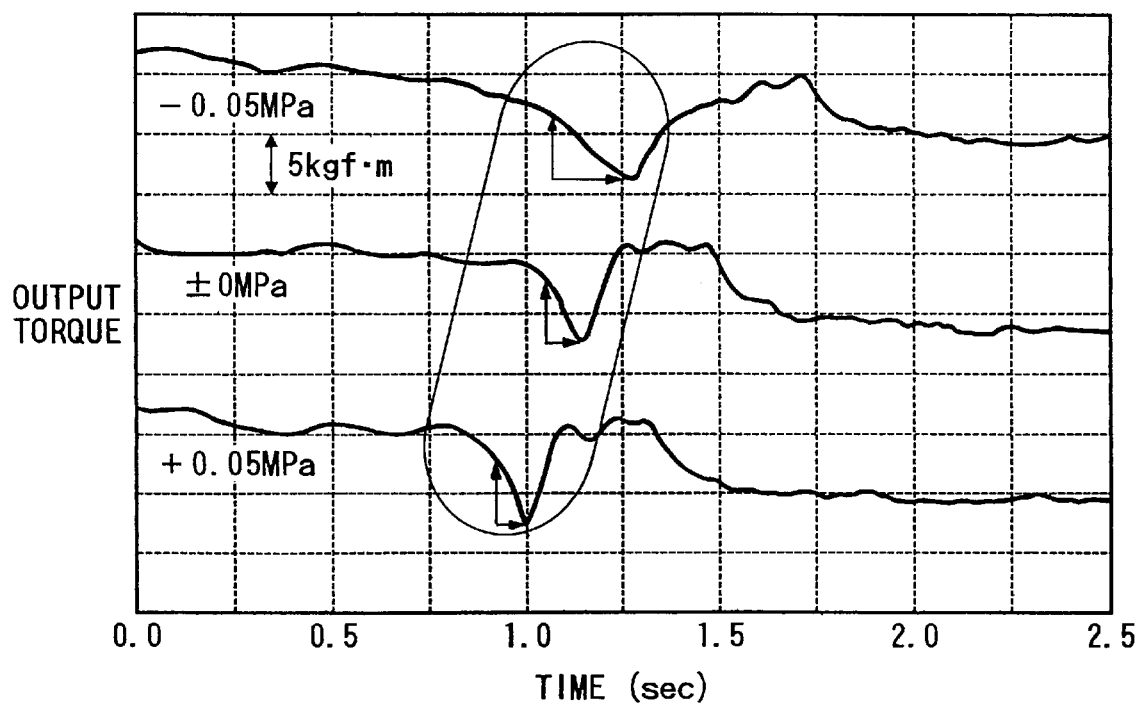
FIG. 31 is a time-domain diagram of measured values of a torque on an output shaft which were available during comparative experiments.

Comparative experiments were performed. During the comparative experiments, a requirement for an upshift from the first-speed gear position and the second-speed gear position was issued at least three times, and the throttle opening degree TVO was held equal to 2/8. During the comparative experiments, the torque on the output shaft 113 was measured while the initial value of the line pressure PL of hydraulic fluid was equal to a normal value and the duty cycle of the drive signal to the line-pressure controlling solenoid valve 116 was held at a fixed value after the quickly charging process. Also, the torque on the output shaft 113 was measured while the initial value of the line pressure PL of hydraulic fluid was higher than the normal value by 0.05 MPa and the duty cycle of the drive signal to the line-pressure controlling solenoid valve 116 was held at the fixed value after the quickly charging process. Furthermore, the torque on the output shaft 113 was measured while the initial value of the line pressure PL of hydraulic fluid was lower than the normal value by 0.05 MPa and the duty cycle of the drive signal to the line-pressure controlling solenoid valve 116 was held at the fixed value after the quickly charging process. FIG. 31 shows the results of the measurements. According to the results of the measurements, the time interval tTr of the toque phase sensitively depended on the line pressure PL of hydraulic fluid.

What is claimed is:

1. A control apparatus for an automotive automatic transmission having an input shaft receiving a rotational force from an engine, an output shaft for outputting a rotational force to a vehicle driving wheel, a frictional engagement member having an adjustable engagement condition, and a transmission means for transmitting a rotational force from the input shaft to the output shaft at a gear speed ratio which depends on the engagement condition of the frictional engagement member, the control apparatus comprising:

an engagement condition adjusting means for adjusting the engagement condition of the frictional engagement member by supplying a hydraulic pressure thereto in response to an instructed control amount; and a control amount calculating means for calculating the control amount, wherein the control amount gradually increases with respect to time during a torque phase before a start of an inertia phase, and a rate of increase in the control amount increases with respect to time.

2. A control apparatus as recited in claim 1, further comprising a learn correction means for learn-correcting the curve in response to a previous shift condition.

3. A control apparatus as recited in claim 1 or 2, further comprising a slope correcting means for correcting a slope of the curve in response to the hydraulic pressure fed to the engagement condition adjusting means and a torque applied to the input shaft.

4. A control apparatus as recited in claim 1, wherein an initial value of the control amount is set in accordance with characteristics of the frictional engagement means and the engagement condition adjusting means.

5. An automatic transmission arrangement, comprising:
an input shaft receiving a rotational force from an engine;
an output shaft for outputting a rotational force to a vehicle driving wheel;
a transmission gear mechanism disposed between the input shaft and the output shaft comprising:
  a plurality of frictional engagement elements moved into engagement by hydraulic pressures; and
  a planetary gear mechanism in which holding conditions of rotation elements are decided by engagement conditions of the frictional engagement elements;
an engagement condition change means for selecting a frictional engagement element, which is changed from a non-engagement condition to an engagement condition in correspondence with a change of a transmission gear position, from among the frictional engagement elements;
a hydraulic pressure control means for controlling a hydraulic pressure applied to the frictional engagement element selected by the engagement condition change means; and
a control command output means for outputting a control command value for hydraulic pressure control with respect to the hydraulic pressure control means;
wherein the control command output means comprises a transmission initial hydraulic pressure control means for, during a torque phase before a start of an inertia phase at a start of a transmission gear change action, outputting the control command value with respect to the hydraulic pressure control means while increasing the control command value such that the hydraulic pressure applied to the frictional engagement element is gradually increased, and a rate of increase thereof increases with respect to time.

6. A control apparatus as recited in claim 5, wherein the transmission initial hydraulic pressure control means outputs the control command value which is expressed by at least a second order function with respect to time.

7. A control apparatus as recited in claim 5 or 6, wherein the transmission initial hydraulic pressure control means outputs the control command value such that after an increase rate of the control command value reaches a given value, the increase rate of the control command value is fixed to the given value.

8. An automatic transmission arrangement, comprising:
an input shaft receiving a rotational force from an engine;
an output shaft for outputting a rotational force to a vehicle driving wheel;
a transmission gear mechanism disposed between the input shaft and the output shaft comprising:
  a plurality of frictional engagement elements which are moved into engagement by hydraulic pressure; and
  a planetary gear mechanism in which holding conditions of rotation elements are determined by engagement conditions of the frictional engagement elements;
an engagement condition change means for selecting a frictional engagement element, which is changed from a non-engagement condition to an engagement condition in correspondence with a change of a transmission gear position, from among the frictional engagement elements;
a hydraulic pressure control means for controlling a hydraulic pressure applied to the frictional engagement element selected by the engagement condition change means; and
a control command output means for outputting a control command value for hydraulic pressure control with respect to the hydraulic pressure control means;
wherein the control command output means comprises:
  a transmission initial hydraulic pressure control means for, during a stage before a start of an inertia phase at a start of a transmission gear change action, outputting the control command value with respect to the hydraulic pressure control means while increasing the control command value such that the hydraulic pressure applied to the frictional engagement element is gradually increased, and the control command value with respect to the hydraulic pressure control means is increased at a first slope for a given time interval and is then increased at a second slope greater than the first slope so as to provide a greater increase rate after a lapse of the given time interval.

9. A control apparatus as recited in claim 5, wherein the transmission initial hydraulic pressure control means comprises a lower initial value setting means for setting a lower initial value so as to provide an engagement hydraulic pressure lower than a normal as an initial value of the control command value.

10. A control apparatus as recited in claim 5, wherein the control command output means comprises a quick charge control means for, prior to operation of the transmission initial hydraulic pressure control means, quickly charging the frictional engagement element, which is changed from the non-engagement condition to the engagement condition, with hydraulic working fluid.

11. A control apparatus as recited in claim 5, wherein the hydraulic pressure control means comprises a direct control means for directly controlling the hydraulic pressure applied to the frictional engagement element.

12. A control apparatus as recited in claims 5, wherein the hydraulic pressure control means comprises a line pressure control means for adjusting a line pressure of a hydraulic passage for feeding pressurized hydraulic fluid to the frictional engagement element.

13. A control apparatus as recited in claim 12, wherein the line pressure is applied to the frictional engagement element via an accumulator.

14. A control apparatus as recited in claim 5, wherein the transmission initial hydraulic pressure control command means comprises a learn correction means for learn-correcting a calculation condition of the control command value in the basis of an outcome of a previous transmission shift.

15. A control apparatus as recited in claim 14, wherein the learn correction means comprises:
a time measurement means for measuring a time interval from a start of an increase in an initial hydraulic pressure to a start of an inertia phase;

a reference time setting means for setting a predetermined reference time interval; and an initial hydraulic pressure change means for changing an initial hydraulic pressure at a start of an increase in response to a difference between the time interval measured by the time measurement means and the reference time interval.

16. A control apparatus as recited in claim 15, wherein the initial hydraulic pressure change means increases the initial hydraulic pressure as the time interval measured by the time measurement means is longer than the reference time interval.

17. A control apparatus as recited in claim 16, wherein the initial hydraulic pressure change means increases the initial hydraulic pressure by an amount proportional to the difference between the time interval measured by the time measurement means and the reference time interval.

18. A control apparatus as recited in claim 14, wherein the learn correction means comprises:

a time measurement means for measuring a time interval from a start of an increase in an initial hydraulic pressure to a start of an inertia phase;

a reference time setting means for setting a predetermined reference time interval; and an increase rate change means for changing an increase rate of the control command value by the initial hydraulic pressure control means in response to a difference between the time interval measured by the time measurement means and the reference time interval.

19. A control apparatus as recited in claim 18, wherein the increase rate change means increases the increase rate as the time interval measured by the time measurement means is longer than the reference time interval.

20. A control apparatus as recited in claim 19, wherein the increase rate change means increases the increase rate by an amount proportional to the difference between the time interval measured by the time measurement means and the reference time interval.

21. A control apparatus as recited in one of claims 8, wherein the transmission initial hydraulic pressure control command means comprises a learn correction means for learn-correcting a calculation condition of the control command value on the basis of an outcome of a transmission shift.

22. A control apparatus as recited in claim 21, wherein the learn correction means comprises:

a time measurement means for measuring a time interval from a start of an increase in an initial hydraulic pressure to a start of an inertia phase;

a reference time setting means for setting a predetermined reference time interval; and a first slope change means for changing the first slope in response to a difference between the time interval measured by the time measurement means and the reference time interval.

23. A control apparatus as recited in claim 22, wherein the first slope change means increases the first slope as the time interval measured by the time measurement means is longer than the reference time interval.

24. A control apparatus as recited in claim 23, wherein the first slope change means increases the first slope by an amount proportional to the difference between the time interval measured by the time measurement means and the reference time interval.

25. A control apparatus as recited in claim 21, wherein the learn correction means comprises:

a time measurement means for measuring a time interval from a start of an increase in an initial hydraulic pressure to a start of an inertia phase;

a reference time setting means for setting a predetermined reference time interval; and a second slope change means for changing the second slope in response to a difference between the time interval measured by the time measurement means and the reference time interval.

26. A control apparatus as recited in claim 25, wherein the second slope change means increases the second slope as the time interval measured by the time measurement means is longer than the reference time interval.

27. A control apparatus as recited in claim 26, wherein the second slope change means increases the second slope by an amount proportional to the difference between the time interval measured by the time measurement means and the reference time interval.

28. A control apparatus as recited in claim 21, wherein the learn correction means comprises:

a time measurement means for measuring a time interval from a start of an increase in an initial hydraulic pressure to a start of an inertia phase;

a reference time setting means for setting a predetermined reference time interval; and a slope switch timing change means for changing the given time interval in response to a difference between the time interval measured by the time measurement means and the reference time interval.

29. A control apparatus as recited in claim 28, wherein the slope switch timing change means shortens the given time interval as the time interval measured by the time measurement means is longer than the reference time interval.

30. A control apparatus as recited in claim 29, wherein the slope switch timing change means shortens the given time interval by an amount proportional to the difference between the time interval measured by the time measurement means and the reference time interval.

* * * * *